United States Patent
Rissanen et al.

(10) Patent No.: US 9,268,144 B2
(45) Date of Patent: Feb. 23, 2016

(54) METHOD FOR PRODUCING A MIRROR PLATE FOR FABRY-PEROT INTERFEROMETER, AND A MIRROR PLATE PRODUCED BY THE METHOD

(71) Applicant: Teknologian tutkimuskeskus VTT, Espoo (FI)

(72) Inventors: Anna Rissanen, Espoo (FI); Jarkko Antila, Espoo (FI)

(73) Assignee: TEKNOLOGIAN TUTKIMUSKESKUS VTT, Vtt (FI)

( * ) Notice: Subject to any disclaimer, the term of this patent is extended or adjusted under 35 U.S.C. 154(b) by 30 days.

(21) Appl. No.: 14/306,157

(22) Filed: Jun. 16, 2014

(65) Prior Publication Data
US 2014/0368825 A1    Dec. 18, 2014

(30) Foreign Application Priority Data

Jun. 18, 2013 (FI) ...................................... 20135666

(51) Int. Cl.
*G01B 9/02* (2006.01)
*G02B 27/14* (2006.01)
(Continued)

(52) U.S. Cl.
CPC ................ *G02B 27/142* (2013.01); *G01J 3/26* (2013.01); *G02B 26/001* (2013.01); *G02B 5/0833* (2013.01); *G02B 27/1013* (2013.01); *G02B 27/141* (2013.01)

(58) Field of Classification Search
CPC .. G02B 6/29358; G02B 5/284; G02B 26/001; G02B 27/142; G02B 27/1073; G02B 5/0833; G01J 3/26; G01J 3/45; G01J 3/021; G01D 5/24

USPC ........... 356/454, 519, 578; 359/260, 248, 247
See application file for complete search history.

(56) References Cited

U.S. PATENT DOCUMENTS 7,106,514 B2 * 9/2006 Murata et al. ................. 359/578
2002/0167730 A1 * 11/2002 Needham et al. ............. 359/578
(Continued)

FOREIGN PATENT DOCUMENTS

DE    10226305 C1    10/2003
EP    2120082 A1    11/2009
(Continued)

OTHER PUBLICATIONS

Rees D et al: "A stable, rugged, capacitance-stabilised piezoelectric scanned Fabry-Perot etalon", Journal of Physics E. Scientific Instruments, IOP Publishing, Bristol, GB, vol. 14, No. 11, Nov. 1, 1981, pp. 1320-1325, XP020016388, ISSN: 0022-3735, DOI: 10.1088/0022-3735/14/11/024.

(Continued)

*Primary Examiner* — Michael P Lapage
(74) *Attorney, Agent, or Firm* — Ziegler IP Law Group LLC.

(57) ABSTRACT

A method for producing a mirror plate for a Fabry-Perot interferometer includes providing a base slab, which includes a substrate coated with a reflective multilayer coating, forming one or more intermediate layers on the base slab such that the lowermost intermediate layer substantially consists of silica, and such that the multilayer coating is at least partially covered by the lowermost intermediate layer, forming one or more capacitive sensor electrodes by depositing conductive material on top of the intermediate layers, and removing material of the lowermost intermediate layer by etching in order to form an exposed aperture portion of the multilayer coating.

8 Claims, 16 Drawing Sheets

(51) Int. Cl.
*G01J 3/26* (2006.01)
*G02B 26/00* (2006.01)
*G02B 5/08* (2006.01)
*G02B 27/10* (2006.01)

(56) References Cited

U.S. PATENT DOCUMENTS

| | | | |
|---|---|---|---|
| 2006/0008200 A1* | 1/2006 | Nakamura et al. | 385/15 |
| 2006/0121361 A1* | 6/2006 | Rolfson | 430/5 |
| 2006/0183644 A1* | 8/2006 | Nakamura et al. | 505/210 |
| 2007/0171530 A1 | 7/2007 | Nakamura | |
| 2010/0103522 A1 | 4/2010 | Matsumoto | |
| 2010/0302660 A1* | 12/2010 | Hirokubo et al. | 359/850 |
| 2011/0228397 A1* | 9/2011 | Matsushita | 359/578 |
| 2012/0188646 A1* | 7/2012 | Sano et al. | 359/578 |
| 2012/0212822 A1* | 8/2012 | Kitahara | 359/578 |
| 2013/0038876 A1* | 2/2013 | Arakawa et al. | 356/416 |

FOREIGN PATENT DOCUMENTS

| | | |
|---|---|---|
| JP | 197362 A | 10/2011 |
| JP | 088419 A | 8/2012 |
| JP | 155023 A | 8/2012 |

OTHER PUBLICATIONS

Extended European Search Report, dated Oct. 8, 2014, re Application No. 14397523.3, 6 pages.

Rees, D. et al. A stable, rugged, capacitance-stabilised piezoelectric scanned Fabry-Perot etalon. Journal of Physics E: Scientific Instruments. 1981, vol. 14, No. 11, pp. 1320-1325.

Office Action; Finnish Patent and Registration Office; 20135666; Apr. 3, 2014 (7 pages).

Japanese Office action mailed Jul. 28, 2015 for corresponding Japanese application No. 2014-123908.

* cited by examiner

Fig. 3a    COMPARATIVE EXAMPLE

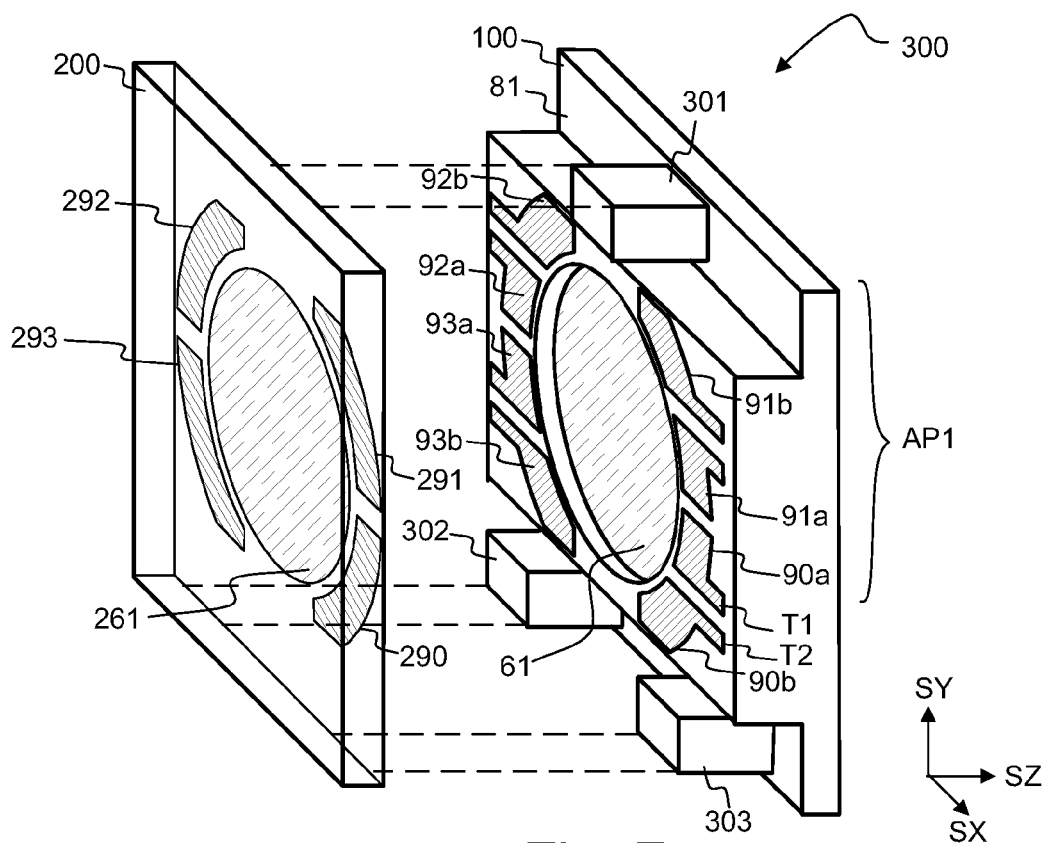
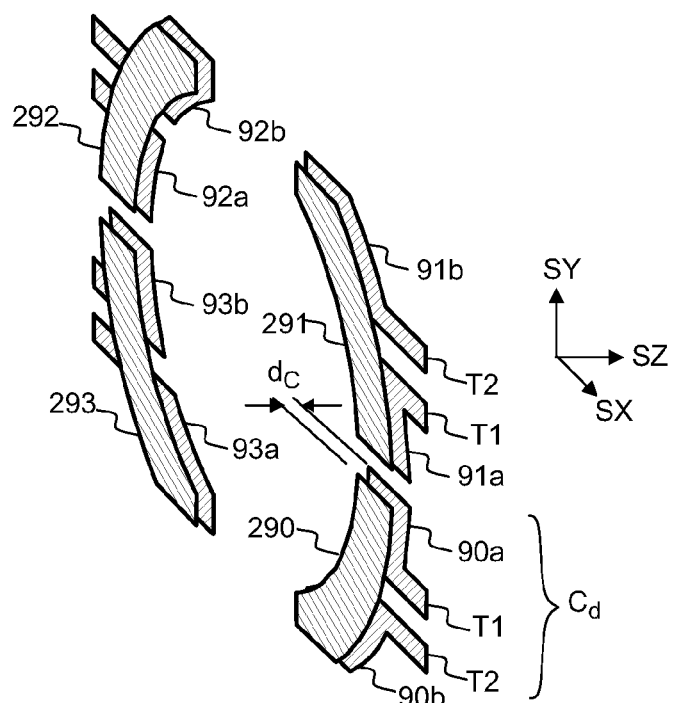
Fig. 7a
Fig. 7b

METHOD FOR PRODUCING A MIRROR PLATE FOR FABRY-PEROT INTERFEROMETER, AND A MIRROR PLATE PRODUCED BY THE METHOD

FIELD

Some variations relate to producing semi-transparent mirrors, which are suitable for use in a Fabry-Perot interferometer.

BACKGROUND

A Fabry-Perot interferometer comprises a first semi-transparent mirror and a second semi-transparent mirror, which are arranged to form an optical cavity. The Fabry-Perot interferometer may provide one or more transmission peaks. The spectral position of the transmission peaks may be changed by changing the distance between the mirrors. The distance between the mirrors may be called as the mirror gap or as the mirror spacing.

The interferometer may comprise e.g. a piezoelectric actuator for adjusting the mirror spacing. The piezoelectric actuator may be driven by applying a driving voltage to the actuator, wherein each voltage value of the driving voltage may be associated with different mirror spacing. The value of the mirror spacing may be determined from the corresponding value of the driving voltage e.g. by using a regression function. The regression function may be determined by varying the mirror spacing, and by monitoring transmission of a laser beam through the interferometer. When the transmitted intensity reaches a maximum, the value of the mirror spacing may be calculated from the wavelength of the laser beam by using the Fabry-Perot transmission function.

SUMMARY

Some variations relate to a method for producing a mirror plate for a Fabry-Perot interferometer. Some variations relate to a Fabry-Perot interferometer, which comprises a mirror plate. Some variations relate to a spectrometer, which comprises a Fabry-Perot interferometer According to a first aspect, there is provided a method for producing a mirror plate for a Fabry-Perot interferometer, the method comprising:
  providing a base slab, which comprises a substrate coated with a semi-transparent reflective multilayer coating,
  forming one or more intermediate layers on the base slab such that the lowermost intermediate layer substantially consists of silica, and such that the multilayer coating is at least partially covered by the lowermost intermediate layer,
  forming one or more capacitive sensor electrodes by depositing conductive material on top of the intermediate layers, and
  removing material of the lowermost intermediate layer by etching in order to form an exposed aperture portion of the multilayer coating.

According to a second aspect, there is provided a mirror plate for a Fabry-Perot interferometer, the mirror plate comprising:
  a base slab, which has a substrate coated with a semi-transparent reflective multilayer coating,
  one or more intermediate layers implemented on the base slab such that the lowermost intermediate layer substantially consists of silica,
  one or more capacitive sensor electrodes implemented on top of the intermediate layers, and
  an exposed aperture portion of the multilayer coating for reflecting and transmitting light,
  wherein the elevation of the capacitive electrodes with respect to the exposed aperture portion is in the range of 1 µm to 1000 µm.

According to a third aspect, there is provided a Fabry-Perot interferometer comprising:
  a first mirror plate, which comprises:
    a base slab, which has a substrate coated with a semi-transparent reflective multilayer coating,
    one or more intermediate layers implemented on the base slab such that the lowermost intermediate layer substantially consists of silica,
    one or more capacitive sensor electrodes implemented on top of the intermediate layers, and
    an exposed aperture portion of the multilayer coating for reflecting and transmitting light; and
  a second mirror plate, which comprises a counter electrode;
  wherein the interferometer has an adjustable mirror spacing, the electrodes of the mirror plates form a capacitor, whose capacitance depends on the mirror spacing, and the elevation of the capacitive electrodes of the first mirror plate with respect to the exposed aperture portion is in the range of 1 µm to 1000 µm According to a fourth aspect, there is provided a spectrometer comprising a Fabry-Perot interferometer, and an image sensor arranged to detect light transmitted through the interferometer,
  wherein the interferometer comprises:
  a first mirror plate, which in turn comprises:
    a base slab, which has a substrate coated with a semi-transparent reflective multilayer coating,
    one or more intermediate layers implemented on the base slab such that the lowermost intermediate layer substantially consists of silica,
    one or more capacitive sensor electrodes implemented on top of the intermediate layers, and
    an exposed aperture portion of the multilayer coating for reflecting and transmitting light;
  a second mirror plate, which comprises a counter electrode, wherein the interferometer has an adjustable mirror spacing, and the electrodes of the mirror plates form a capacitor, whose capacitance depends on the mirror spacing; and
  a capacitance monitoring unit arranged to provide a sensor signal indicative of said capacitance;
  wherein the elevation of the capacitive electrodes of the first mirror plate with respect to the exposed aperture portion is in the range of 1 µm to 1000 µm.

A Fabry Perot interferometer may be used for spectral analysis. For example, a gas analyzer may comprise a Fabry Perot interferometer for measuring the concentration of a gas based on optical absorption at one or more predetermined wavelengths. For example, an imaging spectrometer may comprise a Fabry Perot interferometer for providing a color image of an object with high spectral resolution.

The Fabry Perot interferometer comprises a first mirror plate and a second mirror plate. The mirror plates of the interferometer may cause constructive interference at one or more wavelengths, which coincide with the transmission peaks of transmission function of the interferometer. The spectral resolution of the interferometer depends on the spectral widths of the transmission peaks. At a low order of interference, the spectral FWHM width of a transmission peak may be e.g. several tens of nanometers. The spectral resolution may be improved by using a large mirror spacing, which allows operation at a high order of interference. The spectral width of a transmission peak provided by a pair of mirror plates may be e.g. in the order of 10 nm when operating at a low order of interference, and the spectral width of a transmission peak provided by the same pair of mirror plates may be e.g. less than 1 nm when operating at a high order of interference. For example, the spectral FWHM width of a transmission peak for a pair of mirror plates may be e.g. substantially equal to 10 nm when the mirror spacing is 2.25 µm and the wavelength is 4500 nm, wherein the spectral FWHM width of a transmission peak for the same pair of mirror plates may be e.g. substantially equal to 0.8 nm when the mirror spacing is 45 µm and the wavelength is 4500 nm. FWHM means full width at half maximum. The mirror spacing 2.25 µm may provide the 1st order of (constructive) interference at the wavelength of 4500 nm. The mirror spacing 45 µm may provide the 20th order of (constructive) interference at the wavelength of 4500 nm. For example, the mirror spacing of 3 µm may provide the 10th order of interference at the wavelength of 600 nm, and the mirror spacing of 300 µm may provide the 1000th order of interference at the wavelength of 600 nm.

The spectral positions of the transmission peaks may be changed by fine-tuning the mirror spacing. The spectral positions of the transmission peaks may be may be determined by monitoring the mirror spacing. The Fabry Perot interferometer may comprise capacitive electrodes for monitoring the mirror spacing. The mirror plates of the Fabry Perot interferometer may comprise electrodes, which may together form a sensor capacitor. The electrodes of the sensor capacitor may be called e.g. as sensor electrodes. The sensor electrodes may be implemented on the mirror plates such that the distance between the sensor electrodes depends on the mirror spacing. A sensor electrode may be implemented on a mirror plate such the sensor electrode moves together with said mirror plate. A change of the mirror spacing may cause a change of the distance between the electrodes. The distance between the electrodes may be called as the electrode gap. The capacitance of the sensor capacitor may depend on the electrode gap, which in turn depends on the mirror spacing. Consequently, the mirror spacing may be determined by monitoring the capacitance of the sensor capacitor formed by the electrodes. To the first approximation, the capacitance of the sensor capacitor may be inversely proportional to the electrode gap. However, when the electrode gap is large, the capacitance of the sensor capacitor may be so low that it may be difficult to measure the capacitance value at high accuracy. Furthermore, the accuracy of determining the mirror spacing from a measured capacitance value may decrease when the electrode gap is increased. Yet, the sensor capacitor may become more sensitive to electromagnetic interference (EMI) when the electrode gap is large. When using a large mirror spacing, the accuracy of determining the mirror spacing from the capacitance may be substantially improved by using a mirror plate, which has an elevated sensor electrode. The electrode of the mirror plate may protrude with respect to the reflective multilayer coating of the mirror plate so that the electrode gap may be substantially smaller than the mirror spacing. The elevated electrode may be implemented on a support, which comprises a lowermost layer of silica. The elevated electrode may be implemented by a method, which comprises:

depositing one or more intermediate layers on a mirror plate such that the lowermost intermediate layer consists of silica, depositing one or more layers of conductive material on top of said one or more intermediate layers, and locally removing material of the intermediate layers by etching in order to form an exposed aperture portion.

A method for producing a mirror plate 100 for a Fabry-Perot interferometer 300 may comprise:

providing a base slab 51, which comprises a substrate 50 coated with a semi-transparent reflective multilayer coating 60, forming one or more intermediate layers 62 on the base slab 51 such that the lowermost intermediate layer 62 substantially consists of silica ($SiO_2$) and such that the multilayer coating 60 is at least partially covered by the lowermost intermediate layer 62, forming one or more capacitive sensor electrodes 90, 90a, 90b by depositing conductive material on top of the intermediate layers 62, and removing material of the lowermost intermediate layer 62 by etching ETCH1 in order to form an exposed aperture portion AP1 of the multilayer coating 60.

A mirror plate 100 may comprise:

a base slab 51, which has a substrate 50 coated with a semi-transparent reflective multilayer coating 60, one or more intermediate layers 62, 70 implemented on the base slab 51 such that the lowermost intermediate layer 62 substantially consists of silica ($SiO_2$), one or more capacitive sensor electrodes 90, 90a, 90b implemented on top of the intermediate layers 62, 70, and an exposed aperture portion AP1 of the multilayer coating 60 for reflecting and transmitting light LB1, wherein the elevation d1 of the capacitive electrodes 90, 90a, 90b with respect to the exposed aperture portion AP1 of the multilayer coating 60 is in the range of 1 µm to 1000 µm.

The accuracy of determining the mirror spacing by the capacitive measurement may be improved by using the mirror plate, which has one or more elevated electrodes supported by the silica layer. The mirror spacing may be e.g. in the range of 3 µm to 1000 µm, in order to provide narrow transmission peaks.

The silica layer may provide a highly stable and substantially parallel support for the deposited electrode, while it may also be used as a removable mask, which protects the delicate surface of the reflective multilayer coating during applying additional material layers to the mirror plate.

In an embodiment, the produced mirror plate may withstand high operating temperatures e.g. up to 300° C., or even up to 400° C. In an embodiment, the substrate of the mirror plate may be selected such that the coefficient of thermal expansion of the silica layer substantially matches with the coefficient of thermal expansion of the substrate of the mirror plate, in order to reduce geometrical deformations caused by variation of operating temperature.

A low-cost, fast, accurate, miniature, shock resistant and/or light-weight interferometer may be provided by using one or more elevated sensor electrodes supported by the silica layer.

In an embodiment, the use of several capacitive sensors may provide information regarding the tilt angle of the second mirror plate with respect to the first mirror plate, in addition to providing a mirror spacing value e.g. at the center of the optical aperture.

The elevated electrode of a mirror plate may prevent the reflective multilayer coating of the first plate from accidentally contacting with the reflective coating of the second mirror plate.

BRIEF DESCRIPTION OF THE DRAWINGS

In the following examples, the embodiments will be described in more detail with reference to the appended drawings, in which FIG. 3a shows, by way of example, the mirror spacing as a function of the capacitance of the sensor electrodes, wherein the electrode gap is substantially equal to the mirror spacing, FIG. 7a shows, by way of example, in a three-dimensional exploded view, a first mirror plate and a second mirror plate of a Fabry-Perot interferometer, FIG. 7b shows, by way of example, in a three-dimensional view, the positions of the sensor electrodes of the Fabry-Perot interferometer of FIG. 7a, FIG. 8a shows, by way of example, in a cross-sectional side view, a Fabry-Perot interferometer, where the first mirror plate has elevated sensor electrodes.

DETAILED DESCRIPTION

Figure 1:
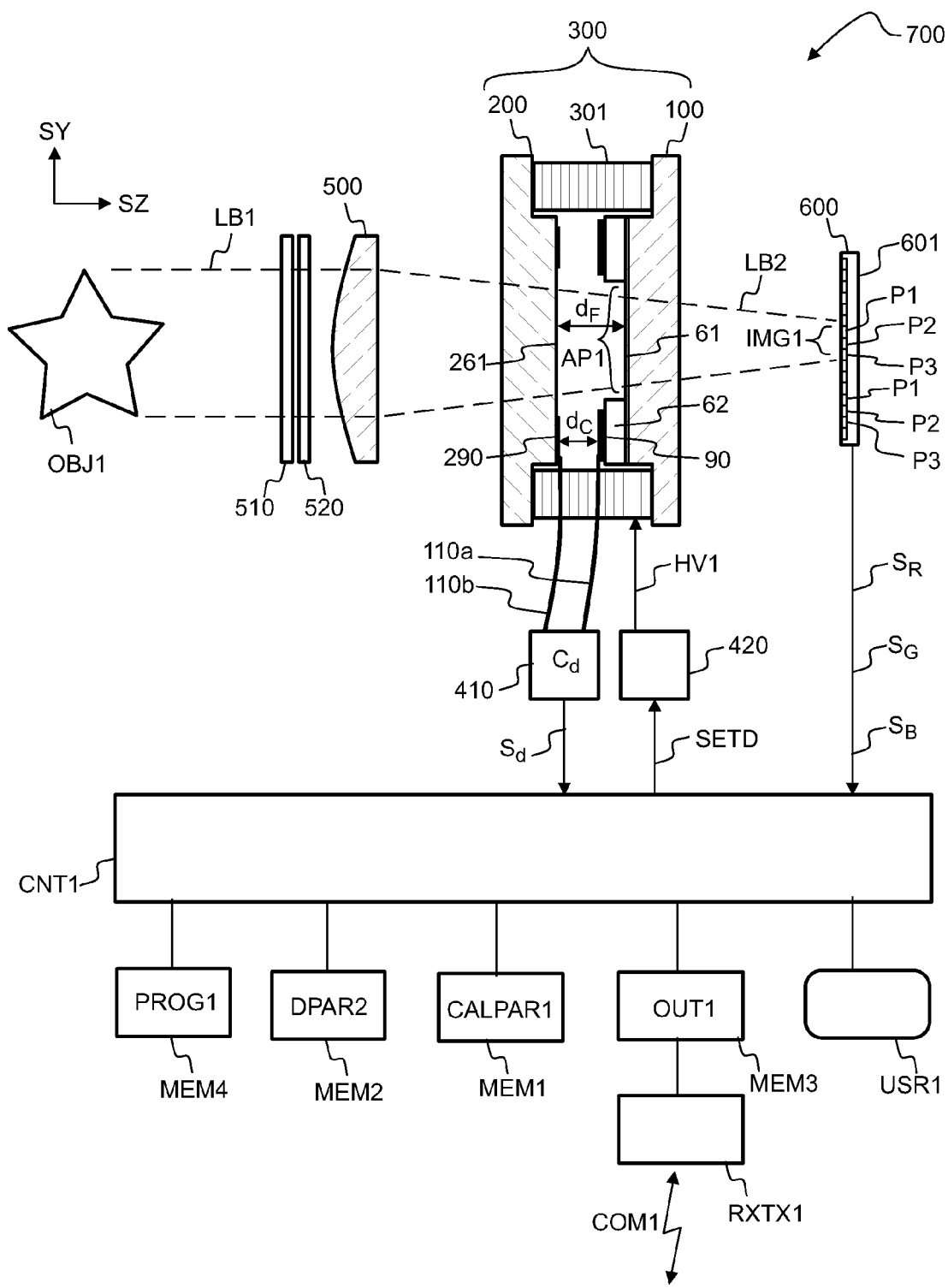
FIG. 1 shows, by way of example, in a cross-sectional side view, a spectrometer comprising a Fabry-Perot interferometer, and an image sensor.

Referring to FIG. 1, a spectrometer 700 may comprise a Fabry-Perot interferometer 300. An object OBJ1 may reflect, emit and/or transmit light LB1, which may be coupled through the interferometer 300 in order to monitor the spectrum of the light LB1. The interferometer 300 may be used e.g. for measuring reflection, transmission (absorption) and/or emission of the light LB1 of the object OBJ1.

The Fabry-Perot interferometer 300 comprises a first mirror plate 100 and a second mirror plate 200. The first mirror plate 100 may comprise a semi-transparent reflective multilayer coating, which has an outer layer 61. The first mirror plate 100 may have an aperture portion AP1 for transmitting and/or reflecting light LB1. The aperture portion AP1 may be an exposed portion of the semi-transparent reflective multilayer coating, which is capable of transmitting and/or reflecting light LB1. Light LB1 impinging on the aperture portion AP1 may be transmitted through the aperture portion AP1 and/or light LB1 impinging on the aperture portion AP1 may be reflected by the aperture portion AP1. The mirror spacing $d_F$ may be adjusted to provide constructive interference for transmitted light at a given wavelength so that the aperture portion AP1 may transmit light. On the other hand, the mirror spacing $d_F$ may be selected to provide destructive interference for transmitted light at the given wavelength so that the aperture portion AP1 may reflect light.

The width of the aperture portion AP1 may be e.g. in the range of 0.5 mm to 2.0 mm, in the range of 2 mm to 20 mm, in the range of 20 mm to 50 mm, or in the range of 50 mm to 100 mm. The width of the aperture portion AP1 may be e.g. in the range of 0.5 mm to 50 mm. The width of the aperture portion AP1 may be e.g. in the range of 2.0 mm to 50 mm. The aperture portion AP1 may have e.g. a substantially circular form or a substantially rectangular form.

The second mirror plate 200 may comprise a semi-transparent reflective coating, which has an outer layer 261. The exposed layer 261 of the second plate may be opposite the exposed layer 61 of the first plate.

At least the first mirror plate 100 may have one or more elevated sensor electrodes 90. The elevated sensor electrodes 90 may be supported by an intermediate layer 62. The second mirror plate 200 may have one or more counter-electrodes 290. The electrodes 90, 290 may together form a sensor capacitor, whose capacitance value $C_d$ depends on the mirror spacing $d_F$. The symbol $C_d$ may herein refer to the capacitor (physical device), and also to the capacitance (measureable physical quantity). The electrodes 90, 290 may also be called as capacitor plates.

The mirror spacing $d_F$ may refer to the distance between the layers 61 and 261. The electrode gap $d_C$ may refer to the distance between the electrodes 90, 290. The mirror spacing $d_F$ may be adjusted by one or more actuators 301.

One or more actuators 301 may be arranged to move the second mirror plate 200 with respect to the first mirror plate 100 (or to move the first mirror plate 100 with respect to the second mirror plate 200. The actuator 301 may be e.g. a piezoelectric actuator, an electrostrictive actuator or a flexoelectric actuator. The reflective multilayer coatings of the mirror plates 100, 200 may be substantially planar and substantially parallel to each other. The layers 61 and 261 may be substantially planar and substantially parallel to each other.

The flatness of the aperture portion AP1 of the mirror plate 100 may be e.g. better than $\lambda_N/20$, better than $\lambda_N/50$, better than $\lambda_N/100$ or even better than $\lambda_N/200$, in order to provide a suitable finesse (i.e. the ratio of the free spectral range to the spectral width of a transmission peak). $\lambda_N$ denotes a predetermined operating wavelength. The predetermined operating wavelength $\lambda_N$ may be e.g. 500 nm, 550 nm, 1000 nm, 2000 nm or 4000 nm. When the flatness is better than $\lambda_N/100$, this means that the RMS peak-to-valley deviation is smaller than $\lambda_N/100$. RMS means root mean square.

The electrodes 90, 290 may together form a sensor capacitor, whose capacitance $C_d$ depends on the mirror spacing $d_F$. The electrodes 90, 290 of the sensor capacitor may be connected to a capacitance monitoring unit 410 e.g. by using conductors 110a, 110b.

The value of the capacitance $C_d$ may be indicative of the mirror spacing $d_F$. The capacitance monitoring unit 410 may provide a sensor signal $S_d$ indicative of the capacitance $C_d$. The capacitance monitoring unit 410 may provide a sensor signal $S_d$ indicative of the electrode gap $d_C$. The capacitance monitoring unit 410 may provide a sensor signal $S_d$ indicative of the mirror spacing $d_F$. The capacitance monitoring unit 410 may provide a sensor signal $S_d$ indicative of the spectral position of a transmission peak PEAK1 (see FIG. 2a). The sensor signal $S_d$ may also be called as a feedback signal.

The capacitance monitoring unit 410 may be arranged to measure the capacitance $C_d$ e.g. by charging the sensor capacitor with a predetermined current, and measuring the time needed to charge the sensor capacitor to a predetermined voltage. The capacitance monitoring unit 410 may be arranged to measure the capacitance $C_d$ e.g. by coupling the sensor capacitor as a part of a resonance circuit, and measuring the resonance frequency of the resonance circuit. The capacitance monitoring unit 410 may be arranged to measure the capacitance $C_d$ e.g. by using the capacitance $C_d$ to repetitively transfer charge to a second tank capacitor, and counting the number of charge transfer cycles needed to reach a predetermined tank capacitor voltage.

The spectrometer 700 may comprise a control unit CNT1. The control unit CNT1 may be arranged to send a control signal $SET_D$ to the interferometer 300 in order to adjust the mirror spacing $d_F$. The interferometer 300 may comprise a driver unit 420. The driver unit 420 may e.g. convert a digital control signal $SET_D$ into an analog signal suitable for driving actuators 301, 302, 303. The driver unit 420 may provide a signal HV1 for driving a piezoelectric actuator 301, 302, 303. In particular, the driver unit 420 may provide e.g. a high voltage signal HV1 for driving a piezoelectric actuator 301, 302, 303.

The sensor signal $S_d$ may be used for monitoring the true mirror spacing $d_F$. The spectral response of the spectrometer 700 may be calibrated e.g. as a function of the mirror spacing $d_F$. The spectrometer 700 may comprise a memory MEM2 for storing calibration parameters DPAR2. The mirror spacing $d_F$ may be determined from the sensor signal $S_d$ e.g. by using the calibration parameters DPAR2.

The spectrometer 700 may further comprise an optical detector 600. In particular, the detector may be an image sensor 600. The image sensor 600 may comprise one or more detector arrays 601. The Fabry-Perot interferometer 300 may form transmitted light LB2 by filtering the light LB1 obtained from the object OBJ1. The interferometer 300 may be optically coupled to the image sensor 600. The transmitted light LB2 may impinge on the image sensor 600. The transmitted light LB2 may be form an optical image IMG1, which may be captured by the image sensor 600.

The spectrometer 700 may optionally comprise imaging optics 500. The imaging optics 500 may be arranged to form one or more two-dimensional optical images IMG1, IMG2 of the object OBJ1 on the image sensor 600. In particular, the imaging optics 500 may be arranged to focus light LB2 to the image sensor 600. The imaging optics 500 may comprise e.g. one or more refractive lenses and/or one or more reflective surfaces (e.g. a paraboloid reflector). The imaging optics 500 may be positioned e.g. between the interferometer 300 and the image sensor 600 and/or between the object OBJ1 and the interferometer 300. One or more components of the imaging optics 500 may also be positioned before the interferometer 300 and one or more components of the imaging optics 500 may be positioned after the interferometer 300. The optics 500 may be omitted e.g. when the spectrometer 700 is used for non-imaging spectral analysis. For non-imaging spectral analysis, the sensor 600 may be a non-imaging detector.

The image sensor 600 may convert the one or more optical images IMG1, IMG2 into a digital image. The image sensor 600 may be arranged to capture the digital image of the object OBJ1. The digital image may be a two-dimensional monochromatic image. The digital image may be a two-dimensional color image. The image sensor 600 may comprise light-sensitive pixels P1, P2, P3, which are arranged to provide detector signals $S_R$, $S_G$, $S_B$.

The spectrometer 700 may be arranged to form the image IMG1 of the object OBJ1 on the image sensor 600 (see FIG. 11), and spectral intensities may be measured substantially simultaneously for two or more different parts of the object OBJ1, without a need to change the orientation of the spectrometer 500 with respect to the object OBJ1.

The detector array may be e.g. a CMOS image sensor Complementary Metal Oxide Semiconductor) or a CCD image sensor (Charge Coupled Device). SX, SY and SZ denote orthogonal directions. The light LB2 may propagate substantially in the direction SZ. The image sensor 600 may be substantially parallel to a plane defined by the directions SX and SY.

The image sensor 600 may be sensitive e.g. in the ultraviolet, visible and/or infrared region. The spectrometer 700 may be arranged to measure spectral intensities e.g. in the ultraviolet, visible and/or infrared region.

The spectrometer 700 may comprise a memory MEM1 for storing calibration parameters CALPAR1. The spectrometer 700 may be arranged to obtain one or more detector signal values $S_R$, $S_G$, $S_B$ from the image sensor 600, and to determine one or more intensity values $X(\lambda_0)$, $X(\lambda_1)$, $X(\lambda_2)$ from the detector signal values $S_R$, $S_G$, $S_B$ by using calibration parameters CALPAR1. At each mirror spacing $d_F$, one or more intensity values $X(\lambda_0)$, $X(\lambda_1)$, $X(\lambda_2)$ of the light LB1 may be determined from the detector signals $S_R$, $S_G$, $S_B$ by using calibration parameters CALPAR1. The calibration parameters CALPAR1 may comprise e.g. element values of the 3×3 matrix appearing in the following equation:

$$\begin{bmatrix} X(\lambda_0) \\ X(\lambda_1) \\ X(\lambda_2) \end{bmatrix} = \begin{bmatrix} Q_{Rn+2} & Q_{Gn+2} & Q_{Bn+2} \\ Q_{Rn+1} & Q_{Gn+1} & Q_{Bn+1} \\ Q_{Rn} & Q_{Gn} & Q_{Bn} \end{bmatrix}^{-1} \cdot \begin{bmatrix} S_R \\ S_G \\ S_B \end{bmatrix} \quad (1)$$

The calibration parameters CALPAR1 may be determined e.g. by simulation and/or by experimental measurements. The symbol −1 appearing in the equation (1) means the matrix inversion operation. The meaning of the parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ will be discussed in the context of FIG. 2b.

The spectrometer 700 may optionally comprise a memory MEM3 for storing output OUT1. The output OUT1 may comprise e.g. detector signals $S_R$, $S_G$, $S_B$ and/or intensity values determined from the detector signals $S_R$, $S_G$, $S_B$. The output OUT1 may comprise one or more digital images of the object OBJ1.

The spectrometer 700 may comprise a memory MEM4 for storing a computer program PROG1. The computer program PROG1 may be configured, when executed by one or more data processors (e.g. CNT1), to obtain one or more detector signal values $S_R$, $S_G$, $S_B$ from the optical sensor 600, and to determine one or more intensity values $X(\lambda_0)$, $X(\lambda_1)$, $X(\lambda_2)$ from the detector signal values $S_R$, $S_G$, $S_B$ by using calibration parameters CALPAR1. The spectrometer 700 may be arranged to provide one or more intensity values $X(\lambda_0)$, $X(\lambda_1)$, $X(\lambda_2)$. In an embodiment, the spectrometer 700 may be arranged to compare a measured intensity value $X(\lambda_0)$ with a reference value. In an embodiment, the spectrometer 700 may be arranged to compare a ratio of measured intensity values $X(\lambda_0)/X(\lambda_1)$ with a reference value.

The spectrometer 500 may optionally comprise a user interface USR1 e.g. for displaying information and/or for receiving commands. The user interface USR1 may comprise e.g. a display, a keypad and/or a touch screen.

The spectrometer 500 may optionally comprise a communication unit RXTX1. The communication unit RXTX1 may transmit and/or receive a signal COM1 e.g. in order to receive commands, to receive calibration data, and/or to send output data OUT1. The communication unit RXTX1 may have e.g. wired and/or wireless communication capabilities. The communication unit RXTX1 may be arranged to communicate e.g. with a local wireless network (WLAN), with the Internet and/or with a mobile telephone network.

The spectrometer 500 may be implemented as a single physical unit or as a combination of separate units.

The spectrometer 500 may optionally comprise one or more optical cut-off filters 510, 520 to limit the spectral response of the optical sensor 600. The filters 510, 520 may define the spectral range of the spectrometer 700. The filters 510, 520 may be positioned before and/or after the interferometer 300.

Figure 2A:
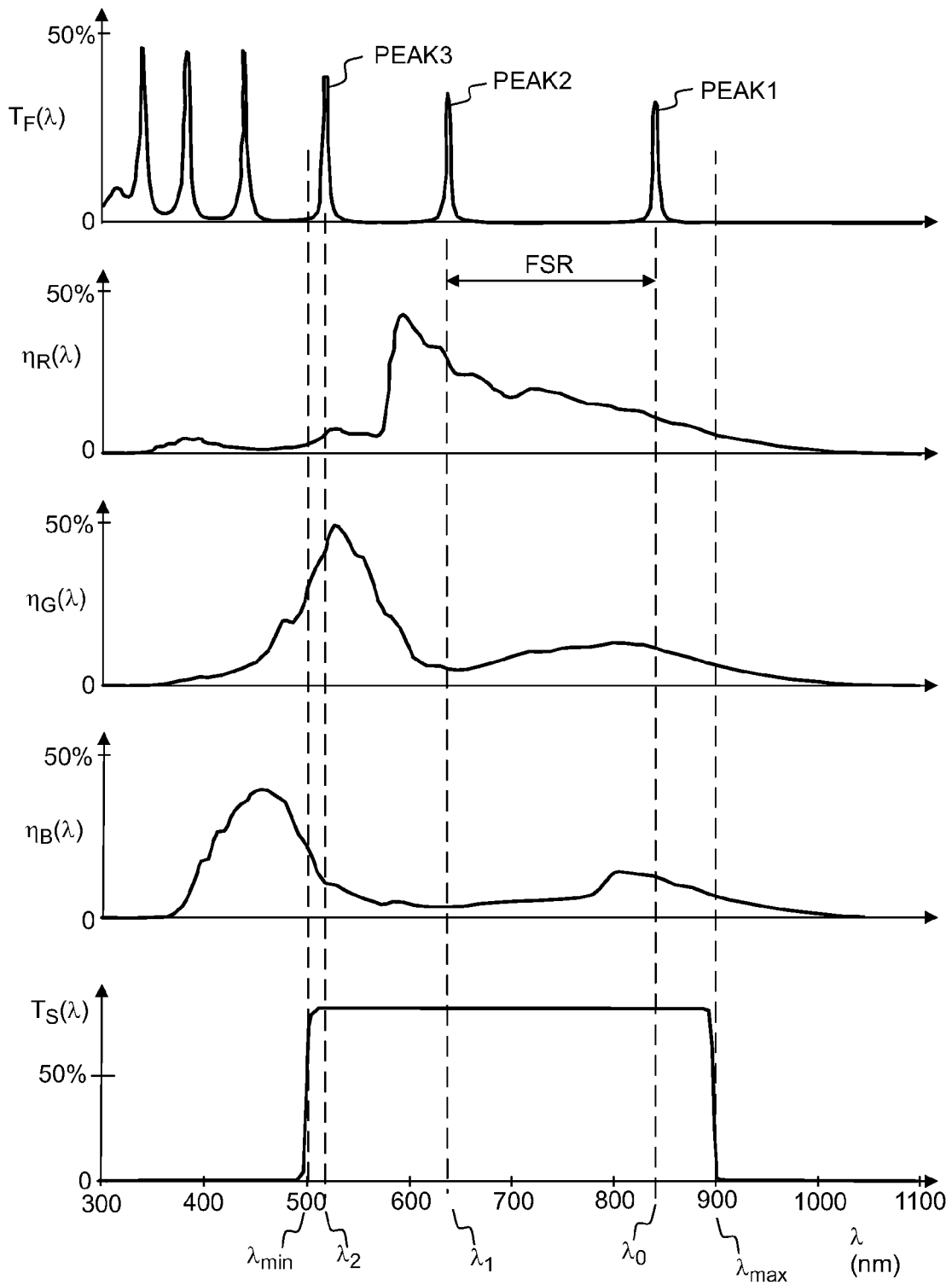
FIG. 2a shows, by way of example, spectral properties of the Fabry-Perot interferometer and the image sensor.

The spectrometer 700 may optionally comprise e.g. a lens and/or an aperture, which is arranged to limit the divergence of the light LB2 transmitted through the interferometer 300, in order to provide a narrow bandwidth for the transmission peaks PEAK1, PEAK2 (FIG. 2a). For example, the divergence of the light LB2 may be limited to be smaller than or equal to 5 degrees. When using focusing optics 500, the optics 500 may be positioned between the interferometer 300 and the sensor 600 in order to minimize divergence of light in the optical cavity formed by the mirror plates 100, 200.

FIG. 2a shows, by way of example, the spectral transmittance of a Fabry-Perot interferometer 300, the spectral sensitivity of detector pixels P1, P2, P3, and the pass band of an optional filter 510.

The uppermost curve of FIG. 2a shows the spectral transmittance $T_F(\lambda)$ of the Fabry-Perot interferometer 300. The spectral transmittance $T_F(\lambda)$ may have one or more adjacent transmittance peaks PEAK1, PEAK2, PEAK3 of the Fabry-Perot interferometer 300. For example, a first transmittance peak PEAK1 may be at a wavelength $\lambda_0$, a second transmittance peak PEAK2 may be at a wavelength $\lambda_1$, and a third transmittance peak PEAK1 may be at a wavelength $\lambda_2$. The spectral positions $\lambda_0$, $\lambda_1$, $\lambda_2$ of the transmission peaks PEAK1, PEAK2, PEAK3 may depend on the mirror spacing $d_F$ according to the Fabry-Perot transmission function. The spectral position of the first peak PEAK1 may be a function $\lambda_0(d_F)$ of the mirror spacing $d_F$. The spectral position of the second peak PEAK2 may be a function $\lambda_1(d_F)$ of the mirror spacing $d_F$. The spectral position of the third peak PEAK3 may be a function $\lambda_2(d_F)$ of the mirror spacing $d_F$. The spectral positions of the transmission peaks may be changed by changing the mirror spacing $d_F$. The spectral positions of the transmission peaks may be changed by fine-tuning the mirror spacing $d_F$.

The transmission peaks PEAK1, PEAK2, PEAK3 may also be called passbands of the Fabry-Perot interferometer. The spectral positions $\lambda_0$, $\lambda_1$, $\lambda_2$ may be shifted by changing the mirror spacing $d_F$. The free spectral range FSR between adjacent peaks may depend on the mirror spacing $d_F$. The Fabry Perot interferometer may comprise capacitive electrodes for monitoring the spectral position of at least one transmission peak.

Each transmission peak PEAK1, PEAK2, PEAK3 of the Fabry Perot interferometer may be associated with a specific order of interference. For example, the first transmittance peak PEAK1 may be associated with an order of interference m, the second transmittance peak PEAK2 may be associated with the order of interference m+1, and the third transmittance peak PEAK3 may be associated with the order of interference m+2. The order of interference m may be e.g. a positive integer.

The second curve from the top shows, by way of example, spectral sensitivity $\eta_R(\lambda)$ of a first pixel P1 of the optical detector 600. The third curve from the top shows spectral sensitivity $\eta_G(\lambda)$ of a second pixel P2 of the image sensor 600. The fourth curve from the top shows spectral sensitivity $\eta_B(\lambda)$ of a third pixel P3 of the image sensor 600. The first pixel P1 may be called e.g. as a red pixel, the second pixel P2 may be called e.g. as a green pixel, and the third pixel P3 may be called e.g. as a blue pixel.

The spectrometer 500 may optionally comprise one or more optical cut-off filters 510, 520 to limit the spectral response of the spectrometer 700. The one or more filters 510, 520 may together provide a spectral transmittance $T_S(\lambda)$. The filters 510, 520 may provide a pass band defined by cut-off wavelengths $\lambda_{min}$ and $\lambda_{max}$.

When the spectral range defined by the wavelengths $\lambda_{min}$ and $\lambda_{max}$ contains only one peak PEAK1, an intensity value $X(\lambda_0)$ may be determined from a single detector signal $S_R$ obtained from the optical sensor 600.

When the spectral range defined by the wavelengths $\lambda_{min}$ and $\lambda_{max}$ contains two or more peaks PEAK1, PEAK2, the intensity values $X(\lambda_0)$ may be solved from measured detector signals e.g. by solving the matrix equation (1).

When the sensor 600 comprises pixels P1, P2 having two (or more) different sensitivity curves $\eta_R(\lambda)$, $\eta_G(\lambda)$, the cut-off wavelengths $\lambda_{min}$ and $\lambda_{max}$ and the mirror spacing $d_F$ may be selected such that the spectral range defined by the wavelengths $\lambda_{min}$ and $\lambda_{max}$ contains only two transmission peaks PEAK1, PEAK2. The mirror spacing $d_F$ and the cut-off wavelengths $\lambda_{min}$ and $\lambda_{max}$ may be selected such that the number of transmission peaks PEAK1, PEAK2, PEAK3 residing between the cut-off wavelengths $\lambda_{min}$ and $\lambda_{max}$ is smaller than or equal to the number of different sensitivity curves $\eta_R(\lambda)$, $\eta_G(\lambda)$, $\eta_B(\lambda)$ of the pixels P1, P2, P3 of the optical sensor 600.

Figure 2B:
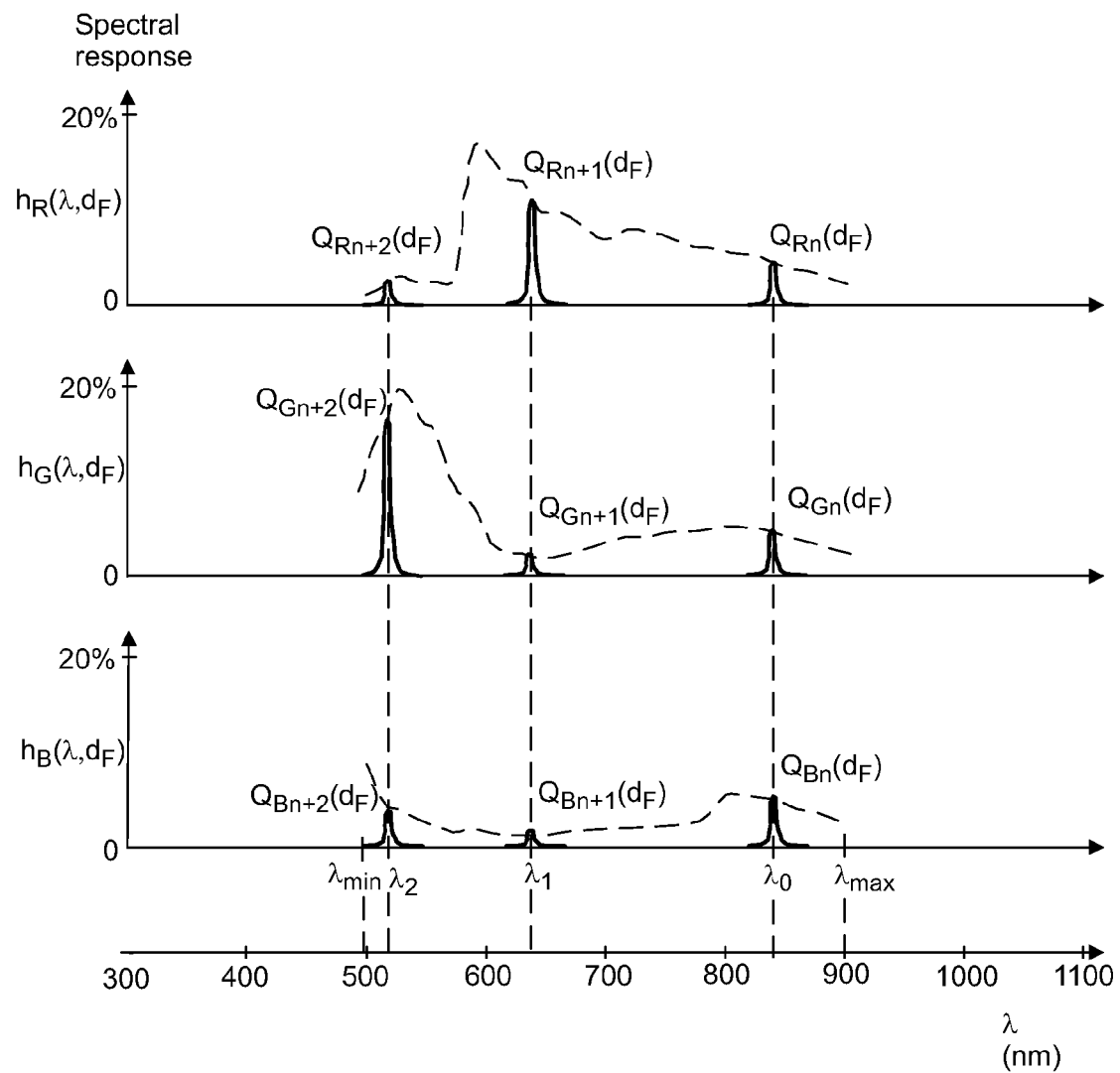
FIG. 2b shows, by way of example, spectral sensitivities for the detector pixels of a combination of the Fabry-Perot interferometer and the image sensor.

FIG. 2b shows, by way of example, spectral response curves $h_R(\lambda,d_F)$, $h_G(\lambda,d_F)$, $h_B(\lambda,d_F)$ for the spectrometer 700 when light impinging on the pixels P1, P2, P3 has been transmitted through the Fabry-Perot interferometer 300. $h_R(\lambda,d_F)$ denotes spectral response for the combination of the interferometer 300 and a first pixel P1, $h_G(\lambda,d_F)$ denotes spectral response for the combination of the interferometer 300 and a second pixel P2, and $h_B(\lambda,d_F)$ denotes spectral response for the combination of the interferometer 300 and a third pixel P3.

The spectral response function $h_R(\lambda,d_F)$ may be formed as a product of the functions $T_F(\lambda,d_F)$, $\eta_R(\lambda)$ and $T_S(\lambda)$. Examples of the functions $T_F(\lambda,d_F)$, $\eta_R(\lambda)$ and $T_S(\lambda)$ were shown e.g. in FIG. 2a. The spectral response function $h_R(\lambda, d_F)$ may be formed as a product of the functions $T_F(\lambda,d_F)$, $\eta_R(\lambda)$ and $T_S(\lambda)$. The spectral response function $h_G(\lambda,d_F)$ may be formed as a product of the functions $T_F(\lambda,d_F)$, $\eta_G(\lambda)$ and $T_S(\lambda)$. The spectral response function $h_B(\lambda,d_F)$ may be formed as a product of the functions $T_F(\lambda,d_F)$, $\eta_B(\lambda)$ and $T_S(\lambda)$. The parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ denote the integrated areas of the peaks appearing in FIG. 2b. The parameters $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be used as elements of the 3×3 matrix appearing in equation (1). Each parameter $Q_{Rn}$, $Q_{Gn}$, $Q_{Bn}$, $Q_{Rn+1}$, $Q_{Gn+1}$, $Q_{Bn+1}$, $Q_{Rn+2}$, $Q_{Gn+2}$, $Q_{Bn+2}$ may be considered to be a function of the mirror spacing $d_F$. For example, the notation $Q_{Rn}(d_F)$ means that the value of the parameter $Q_{Rn}$ may depend on the mirror spacing $d_F$. The symbol −1 appearing in equation (1) means the matrix inversion operation.

Figure 3B:
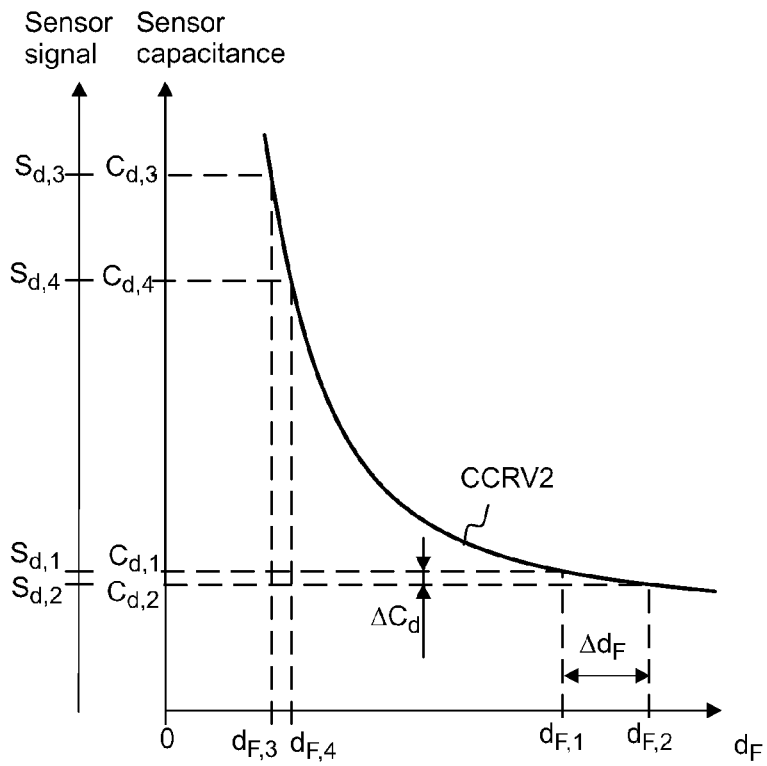
FIG. 3b shows, by way of example, the mirror spacing as a function of the capacitance of the sensor electrodes, wherein the electrode gap is substantially smaller than the mirror spacing.
Figure 3B:
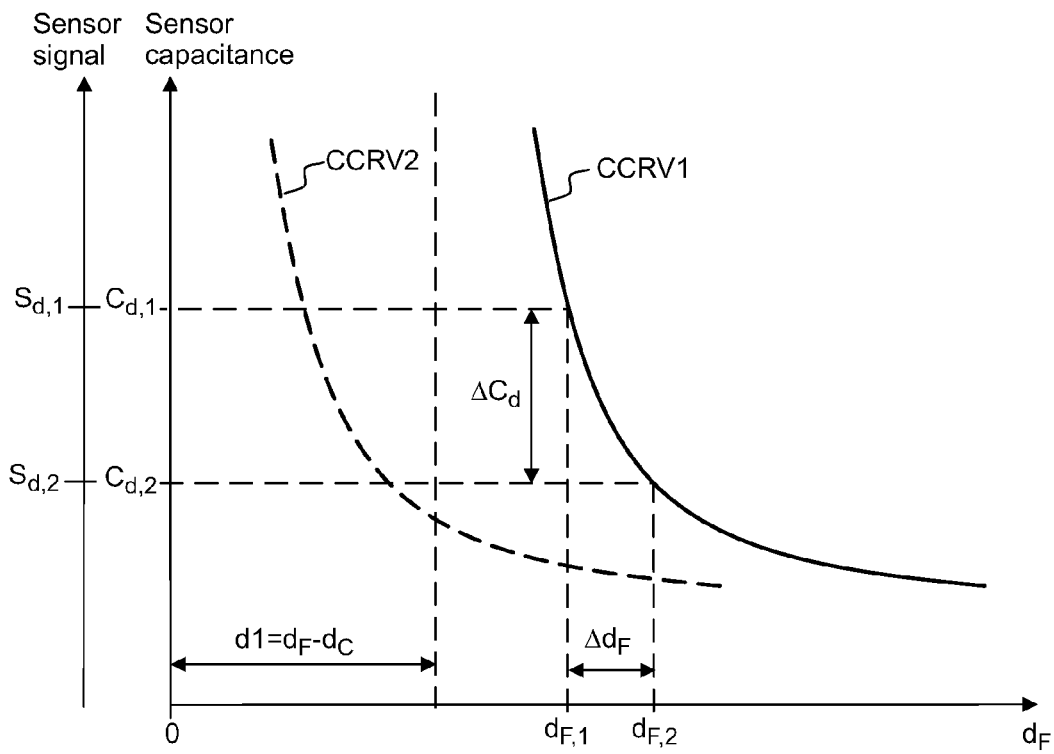

FIG. 3b illustrates how the accuracy may be improved by using an elevated sensor electrode. FIG. 3a shows a comparative example where the interferometer does not comprise an elevated sensor electrode.

The curve CCRV2 of FIG. 3a shows the sensor capacitance $C_d$ as the function of the mirror spacing $d_F$ in a situation where the electrode gap dc is equal to the mirror spacing $d_F$. To the first approximation, the value of the sensor capacitance $C_d$ is inversely proportional to the value of the electrode gap $d_C$. $C_{d,1}$ denotes the sensor capacitance at the mirror spacing value $d_{F,1}$. $C_{d,2}$ denotes the sensor capacitance at the mirror spacing value $d_{F,2}$. $C_{d,3}$ denotes the sensor capacitance at the mirror spacing value $d_{F,3}$. $C_{d,4}$ denotes the sensor capacitance at the mirror spacing value $d_{F,4}$.

The capacitance monitoring unit 410 may a provide a sensor signal value $S_{d,1}$ when the sensor capacitance has a value $C_{d,1}$. The capacitance monitoring unit 410 may provide sensor signal values $S_{d,2}$, $S_{d,3}$, $S_{d,4}$, which correspond to the capacitance values $C_{d,2}$, $C_{d,3}$, $C_{d,4}$, respectively.

The control unit CNT1 may be arranged to determine the value of the mirror spacing $d_F$ from the measured value of the sensor capacitance $C_d$. A change $\Delta C_d$ of the sensor capacitance value may correspond to a change $\Delta d_F$ of the mirror spacing. In this comparative example, when the mirror spacing $d_F$ is large, the slope $\Delta C_d/\Delta d_F$ has a low value. This means that a small error $\Delta C_d$ in the measured value of the sensor capacitance $C_d$ may lead to a large error $\Delta d_F$ in the mirror spacing value $d_F$, which is determined from the measured value of the sensor capacitance $C_d$.

FIG. 3b illustrates a situation where at least one of the mirrors 100, 200 has an elevated sensor electrode 90, i.e. where the mirror spacing $d_F$ is substantially greater than the electrode gap $d_C$. The elevation d1 of the sensor electrode 90 may be equal to the difference $d_F$-$d_C$. The curve CCRV1 shows the sensor capacitance $C_d$ as the function of the mirror spacing $d_F$ when the difference $d_F$-$d_C$ is substantially greater than zero. At a given mirror spacing value $d_{F,1}$, the slope $\Delta C_d/\Delta d_F$ of the curve CCRV1 may be substantially larger than the slope of the curve CCRV2. This means that the error of determining the mirror spacing value $d_F$ from the sensor capacitance $C_d$ may be substantially reduced. In other words, the accuracy of determining the mirror spacing value $d_F$ from the sensor capacitance $C_d$ may be substantially improved when using elevated sensor electrodes 90.

FIGS. 4a to 4e show producing a mirror plate 100, where the elevation d1 of the electrodes 90 may be e.g. in the range of 1 µm to 6 µm.

Figure 4A:
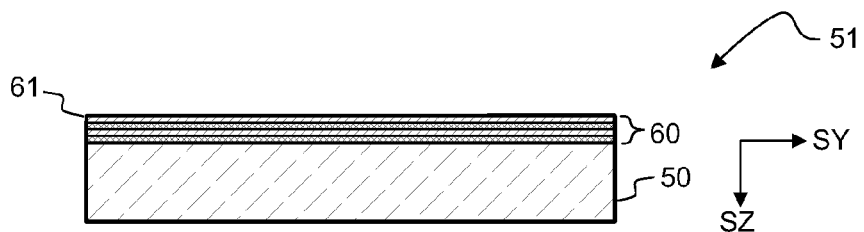
FIG. 4a shows, by way of example, in a cross-sectional side view, a base slab comprising a reflective multilayer coating implemented on a substrate.
Figure 5A:
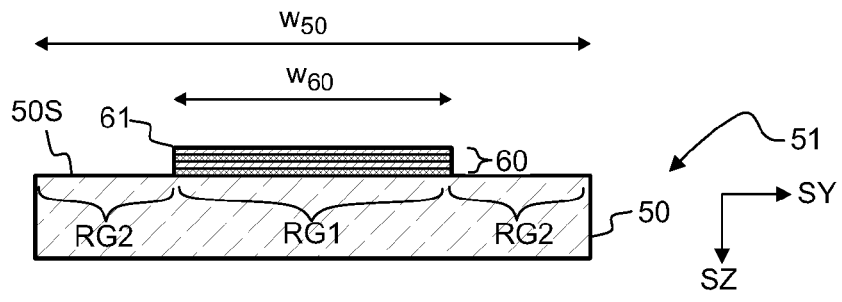
FIG. 5a shows, by way of example, in a cross-sectional side view, a base slab where the reflective multilayer coating does not cover the whole upper surface of the substrate.

Referring to FIG. 4a, a base slab 51 may comprise a substrate 50, which is coated with a multilayer coating 60. The base slab 51 may be called e.g. as a base plate 51. Producing a mirror plate 100 for a Fabry-Perot interferometer 300 may comprise providing a substrate 50, which is coated with a multilayer coating 60. The multilayer coating 60 may have been implemented on a substantially planar top surface of the substrate 50. The coating 60 may cover the top surface of the substrate 50 completely (FIG. 4a) or partially (FIG. 5a). The base slab 51 may also be called e.g. as a based body, as a base plate or as a primary plate. The marking 61 denotes the uppermost layer of the multilayer coating 60.

The material of the substrate 50 may be e.g. silicon (Si), or fused silica (SiO2). The multilayer coating 60 may consist of dielectric layers. The coating 60 may be a dielectric semi-transparent reflective multilayer coating. The materials of the coating 60 may be e.g. silicon, silicon nitride, silica $SiO_2$, and/or aluminum oxide $Al_2O_3$. The material and the thickness of each layer of the coating 60 may be selected such that reflectivity of the multilayer coating 60 is e.g. in the range of 80% to 99.5% at a predetermined nominal operating wavelength $\lambda_N$. The material and the thickness of each layer of the coating 60 may be selected such that reflectivity of the multilayer coating 60 is e.g. in the range of 80% to 99.5% at the wavelength $\lambda_N$. The nominal operating wavelength $\lambda_N$ may be e.g. 500 nm, 550 nm, 1000 nm, 2000 nm or 4000 nm.

Figure 4B:
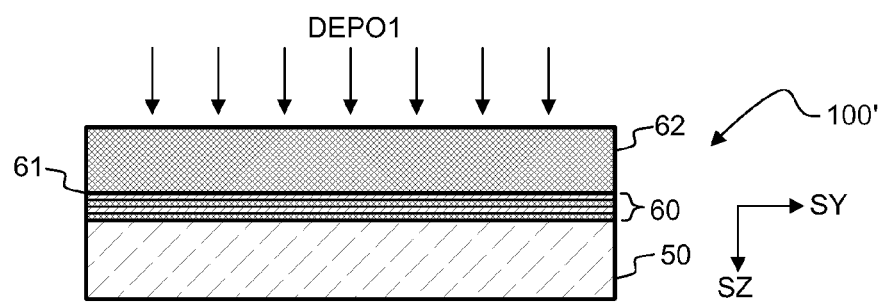
FIG. 4b shows, by way of example, in a cross-sectional side view, forming an intermediate layer by depositing silica on the base slab.

Referring to FIG. 4b, the base slab 51 may be further covered with a layer 62 of silica $SiO_2$ by using a first deposition process DEPO1. The base slab 51 may be covered with the silica layer 62 such that the multilayer coating 60 is covered with the silica layer 62. The base slab 51 may be covered with the silica layer 62 such that the multilayer coating 60 is at least partially covered with the silica layer 62. In an embodiment, the multilayer coating 60 may be substantially completely covered by the silica layer 62.

The silica layer 62 may be formed e.g. by using low pressure chemical vapor deposition (LPCVD), plasma enhanced chemical vapor deposition (PECVD), or atomic layer deposition (ALD). The silica layer 62 may be called e.g. as an intermediate layer, as a lowermost intermediate layer, or as the first intermediate layer.

The marking 100' denotes a semi-manufactured mirror plate.

Figure 4C:
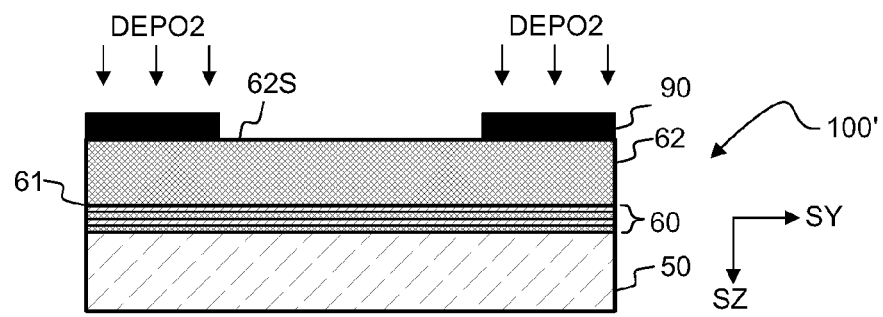
FIG. 4c shows, by way of example, in a cross-sectional side view, depositing a conductive layer on the intermediate layer.

Referring to FIG. 4c, one or more electrodes 90 may be formed on top of the silica layer 62 e.g. by using a second deposition process DEPO2. The electrodes may be deposited e.g. on the top surface 62S of the lowermost intermediate layer 62. The electrodes may be formed e.g. by physical vapor deposition (PVD), in particular by sputtering. The material of the electrodes 90 may be e.g. gold, silver, copper or aluminum.

The silica layer 62 may be formed on the top surface of a substantially flat multilayer coating 60, and/or on the top surface 50S of the substrate 50. The coating 60 and substrate 50 may be extremely flat. For example, the flatness of the top surface 50S of the substrate 50 may be e.g. better than $\lambda_N/20$, better than $\lambda_N/50$, better than $\lambda_N/100$ or even better than $\lambda_N/200$. For example, the flatness of the multilayer coating 60 may be e.g. better than $\lambda_N/20$, better than $\lambda_N/50$, better than $\lambda_N/100$ or even better than $\lambda_N/200$.

In an embodiment, the silica layer 62 and the electrode layer 90 may be produced by deposition processes DEPO1, DEPO2, which are spatially uniform to a high degree so that the deposed layers may also have spatially uniform thickness. Consequently, the electrodes 90 formed by using the deposition processes DEPO1, DEPO2 may be highly parallel to the multilayer coating.

In an embodiment, the electrodes 90 formed by using the deposition processes DEPO1, DEPO2 may be sufficiently parallel to the multilayer coating 60 even when the top surface of the silica layer 62 is not leveled by removing material away from the deposited silica layer 62.

Figure 4D:
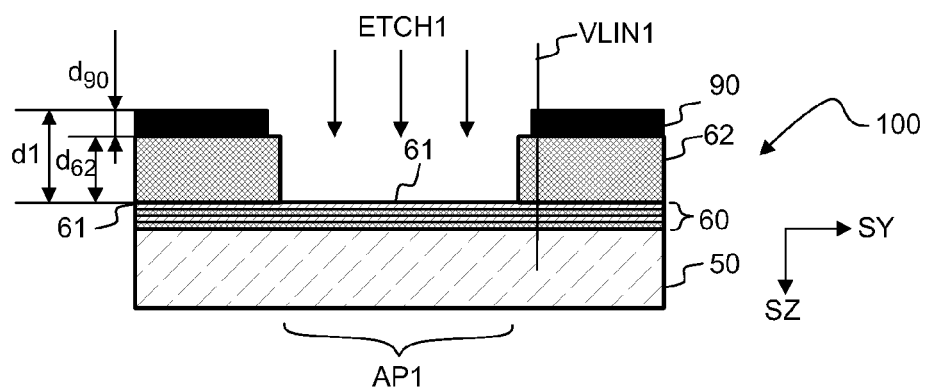
FIG. 4d shows, by way of example, in a cross-sectional side view, removing silica from the aperture area of the mirror plate.

Referring to FIG. 4d, material of the silica layer 62 may be locally removed in order to form an aperture portion AP1 where the uppermost layer 61 of the coating 60 is exposed. The coating 60 may be exposed such that a solid-gas interface (or a solid-vacuum interface) is formed on the surface of the layer 61. The silica layer 62 may be removed by using an etching process ETCH1. For example, the etching ETCH1 may comprise using hydrogen fluoride vapor (HF) or by using a liquid, which comprises hydrogen fluoride (e.g. buffered oxide etch, BHF). The etching ETCH1 may remove $SiO_2$ from the aperture portion AP1, so as to expose the smooth surface of the layer 61. The etching ETCH1 may gently remove $SiO_2$ from the aperture portion AP1.

The material of the uppermost layer 61 of the multilayer coating 60 may be selected such that it is substantially resistant to the etching ETCH1.

The flatness of the exposed aperture portion AP1 of the mirror plate 100 may be e.g. better than $\lambda_N/20$, better than $\lambda_N/50$, better than $\lambda_N/100$ or even better than $\lambda_N/200$.

The thickness $d_{62}$ of the intermediate silica layer 62 may be e.g. in the range of 1 to 4 µm. The thickness $d_{90}$ of the electrodes 90 may be e.g. in the range of 0.1 to 2 µm. The elevation $d_1$ may be equal to the sum $d_{62}+d_{90}$. The elevation d1 of the upper surfaces of the electrodes 90, with respect to the solid-gas interface of the coating 60, may be e.g. in the range of 1 µm to 6 µm. For example, the thickness $d_{62}$ may be substantially equal to 2 µm, and the thickness $d_{90}$ may be substantially equal to 1 µm so that the elevation $d_1$ may be substantially equal to 3 µm.

The multilayer coating 60 may extend beneath the electrode 90, i.e. a vertical line VLIN1 may intersect the multilayer coating 60 and the electrode 90, wherein said vertical line VLIN1 is perpendicular to the layer 61.

Figure 4E:
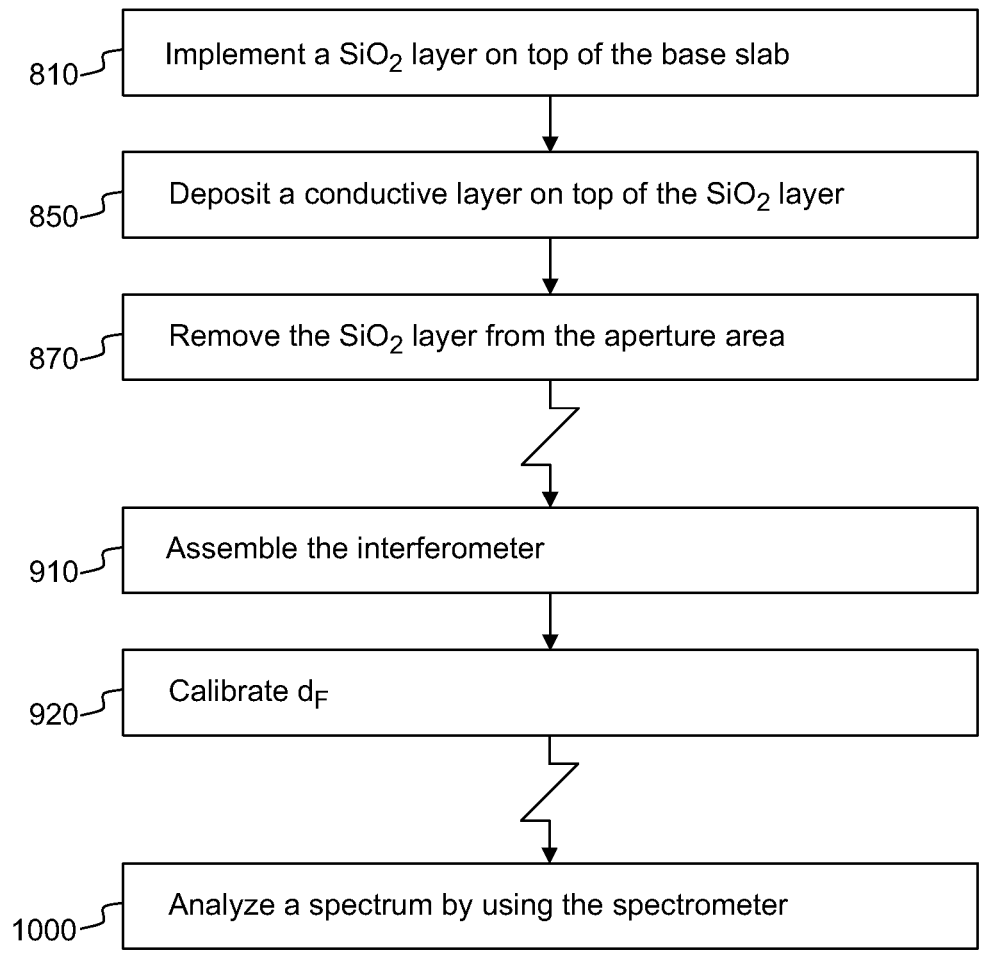
FIG. 4e shows, by way of example, method steps for implementing an elevated sensor electrode on the mirror plate.

FIG. 4e shows method steps for producing the mirror plate 100, whose elevation d1 is e.g. in the range of 1 µm to 6 µm.

In step 810, an intermediate layer 62 of silica may be deposited on the base slab 51. An intermediate layer 62 of silica may be deposited on the multilayer coating 60.

In step 850, one or more electrodes may be formed by depositing conductive material on top of the intermediate layer 62.

In step 870, material of intermediate layer 62 may be locally removed in order to form an exposed aperture portion.

In an optional step 910, a Fabry-Perot interferometer 300 comprising the mirror plate 100 and a second mirror plate 200 may be assembled at a later stage.

In an optional step 920, a capacitance value $C_d$ and/or a sensor signal value $S_d$ indicative of the capacitance value $C_d$ may be experimentally measured for at least one known mirror spacing value $d_F$. The mirror spacing value $d_F$ may be measured e.g. optically (see FIGS. 9a and 9b).

Measurement of the capacitance $C_d$ may require that the electrodes of the mirror plates 100, 200 are not in contact with each other, i.e. the capacitance $C_d$ may have a measurable value only when the electrodes forming the capacitance $C_d$ are not in galvanic contact with each other.

In an optional step 1000, a spectrometer 700 comprising the mirror plate 100 may be used for monitoring (unknown) spectrum OSPEC1 of an object OBJ1.

Referring to FIG. 5a, the multilayer coating 60 does not need to cover the whole top surface 50S of the substrate 50. The base slab 51 may be provided such that the base slab 51 has a reflective multilayer coating 60 which does not cover the whole top surface 50S of the substrate 50. A first portion RG1 of the top surface 50S may be covered with the multilayer coating 60. A second portion RG2 of the top surface 50S may be uncovered, or covered with a coating which is different from the multilayer coating 60. For example, the multilayer coating 60 may be initially formed such that the width $w_{60}$ of the multilayer coating 60 is smaller than the width $w_{50}$ of the top surface 50S. For example, the multilayer coating 60 may cover substantially the whole top surface 50S at an intermediate stage, but the coating 60 may be locally removed to form one or more exposed surface portions RG2.

The flatness of the top surface 50S of the substrate 50 in the region RG1 may be e.g. better than $\lambda_N/20$, better than $\lambda_N/50$, better than $\lambda_N/100$ or even better than $\lambda_N/200$. A sensor electrode may be implemented on top of one or more intermediate layers such that the multilayer coating 60 is located beneath said sensor electrode. One or more sensor electrodes may be implemented on top of one or more intermediate layers such that the multilayer coating 60 is located beneath the sensor electrodes.

In an embodiment, the flatness of the top surface 50S of the substrate 50 in the combination of the regions RG1 and RG2 may be better than $\lambda_N/20$, better than $\lambda_N/50$, better than $\lambda_N/100$ or even better than $\lambda_N/200$. This may facilitate ensuring that a sensor electrode of the mirror plate 100 may be substantially parallel to the multilayer coating 60 also when said electrode has been implemented on top of one or more intermediate layers such that the region RG2 is located beneath said electrode.

Figure 5B:
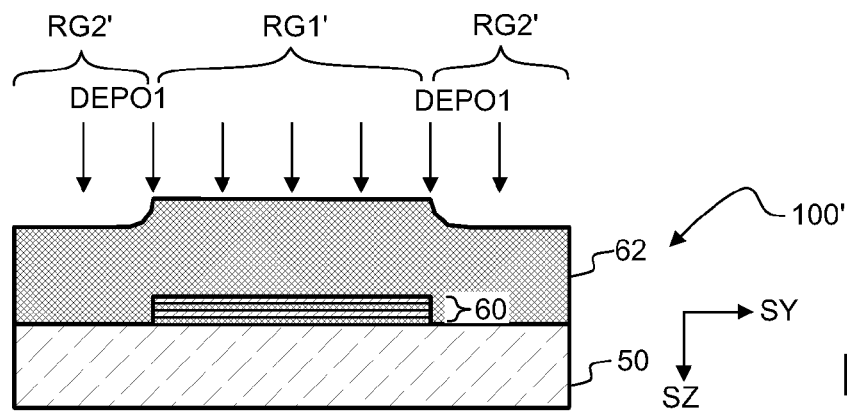
FIG. 5b shows, by way of example, in a cross-sectional side view, forming an intermediate layer by depositing silica on the base slab.

Referring to FIG. 5b, a silica layer 62 may be deposited by a deposition process DEPO1 on the base slab 51 such that the silica layer 62 at least partially covers the multilayer coating 60. The silica layer 62 may be deposited on the base slab 51 such that the silica layer 62 at least partially covers the first region RG1. The silica layer 62 may be deposited on the base slab 51 such that the silica layer 62 covers the whole multilayer coating 60.

The silica layer 62 may optionally cover also the second region RG2. The silica layer 62 may extend beyond the multilayer coating 60. At the second region RG2, the silica layer 62 may be in contact with the substrate 50. The silica layer 62 may cover the second region RG2 partially or completely.

After the deposition DEPO1, the silica layer 62 may have an uneven top surface. A first portion RG1' of the top surface of the silica layer 62 may be at a higher level when compared with a second portion RG2' of the top surface of the silica layer 62. The difference between the height levels may be substantially equal to the thickness of the multilayer coating 60.

Figure 5C:
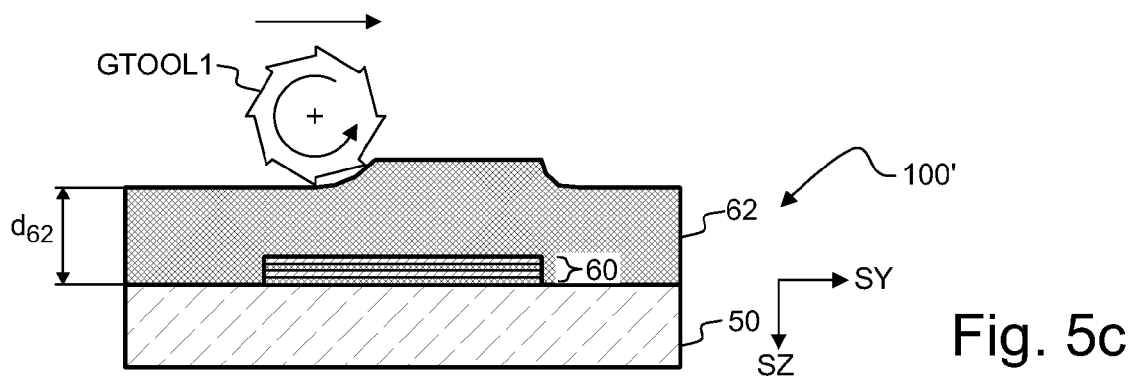
FIG. 5c shows, by way of example, in a cross-sectional side view, leveling the top surface of the intermediate layer.

Referring to FIG. 5c, the top surface of the silica layer 62 may be optionally leveled e.g. by mechanical grinding and/or polishing. The silica layer 62 may be leveled e.g. by using a grinding or polishing device GTOOL1. The device GTOOL1 may be e.g. a rotating device, which may be moved e.g. in the direction SY.

The leveling may be omitted e.g. when the electrodes 90 are implemented only on the portion RG1' or only on the portion RG2'.

Figure 5D:
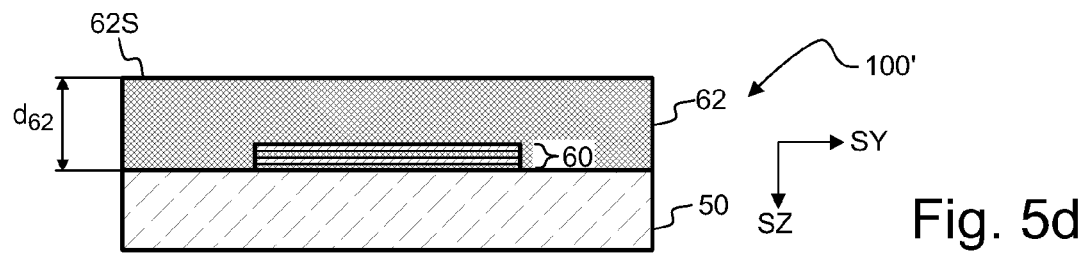
FIG. 5d shows, by way of example, in a cross-sectional side view, a semi-manufactured mirror plate, wherein the top surface of the intermediate layer has been leveled.
Figure 5E:
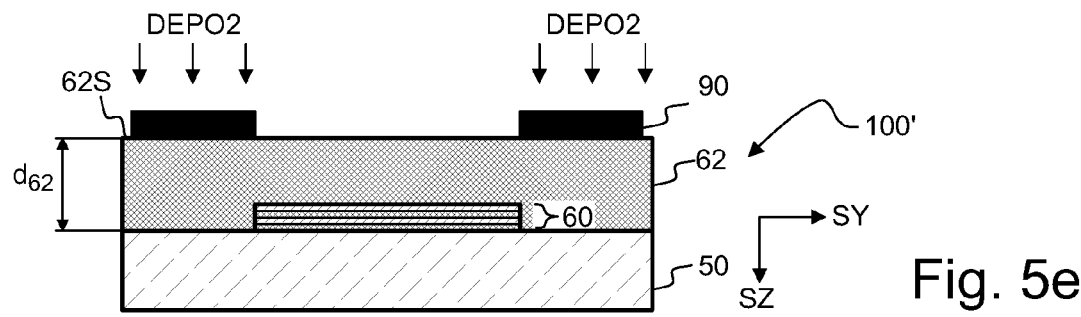
FIG. 5e shows, by way of example, in a cross-sectional side view, depositing a conductive layer on the intermediate layer.

Referring to FIG. 5d, the silica layer 62 may be optionally leveled such that the top surface 62S of the silica layer 62 becomes flat. The silica layer 62 may be leveled such that the top surface 62S of the silica layer 62 is in a single plane. After this, the electrodes 90 may be deposited as shown e.g. in FIG. 5e or FIG. 4c. The electrodes may be deposited e.g. on the top surface 62S of the lowermost intermediate layer 62.

Figure 5F:
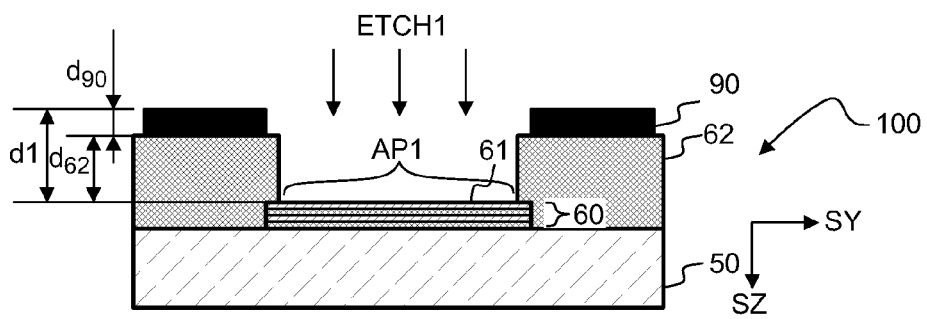
FIG. 5f shows, by way of example, in a cross-sectional side view, removing silica from the aperture area of the mirror plate.

The silica layer 62 may be locally etched away as shown e.g. in FIG. 5f or FIG. 4d, in order to form the exposed aperture portion AP1.

FIGS. 6a to 6j show producing a mirror plate 100, where the elevation of the electrodes 90 may be greater than e.g. 4 µm.

Figure 6A:
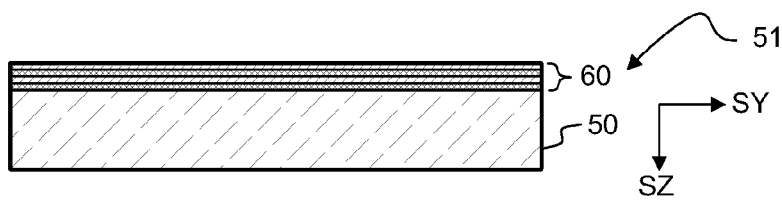
FIG. 6a shows, by way of example, in a cross-sectional side view, a base slab comprising a reflective multilayer coating implemented on a substrate.

Referring to FIG. 6a, producing a mirror plate 100 for a Fabry-Perot interferometer 300 may comprise providing a base slab 51, which comprises a substrate 50 coated with a multilayer coating 60.

The substrate 50 may be e.g. silicon (Si) or fused silica (SiO2). The multilayer coating 60 may consist of dielectric layers. The materials of the coating 60 may be e.g. silicon, silicon nitride, silica $SiO_2$, and/or aluminum oxide $Al_2O_3$. The material and the thickness of each layer of the coating 60 may be selected such that reflectivity of the multilayer coating 60 is e.g. in the range of 80% to 99.5% at the nominal operating wavelength $\lambda_N$.

Figure 6B:
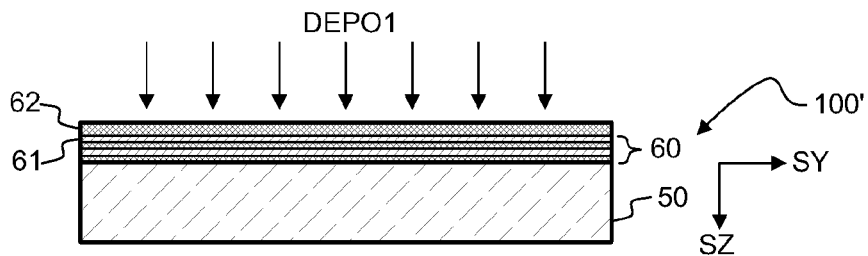
FIG. 6b shows, by way of example, in a cross-sectional side view, forming a first intermediate layer, by depositing silica on the base slab.

Referring to FIG. 6b, the base slab 51 may be covered with a layer 62 of silica $SiO_2$. The silica layer 62 may be formed by a deposition process DEPO1. The silica layer 62 may be formed e.g. by using low pressure chemical vapor deposition (LPCVD), plasma enhanced chemical vapor deposition (PECVD), or atomic layer deposition (ALD). The layer 62 may be called e.g. as a lowermost intermediate layer or as the first intermediate layer.

The first intermediate layer 62 may also be formed e.g. by using one or more of the method steps shown in FIGS. 5a-5d. In particular, the top surface of the silica layer 62 may be leveled before the silica layer 62 is bonded to the additional substrate 70' shown in FIG. 6c.

Figure 6C:
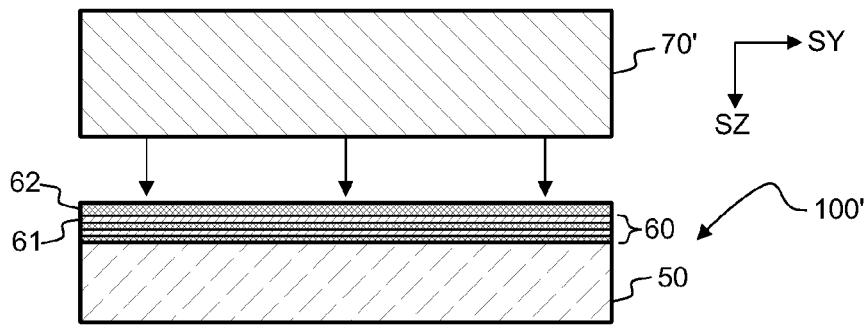
FIG. 6c shows, by way of example, in a cross-sectional side view, placing a second substrate on the layer of silica.

Referring to FIG. 6c an additional substrate 70' may be placed onto the first intermediate layer 62. The additional substrate 70' may be e.g. a silicon wafer.

Figure 6D:
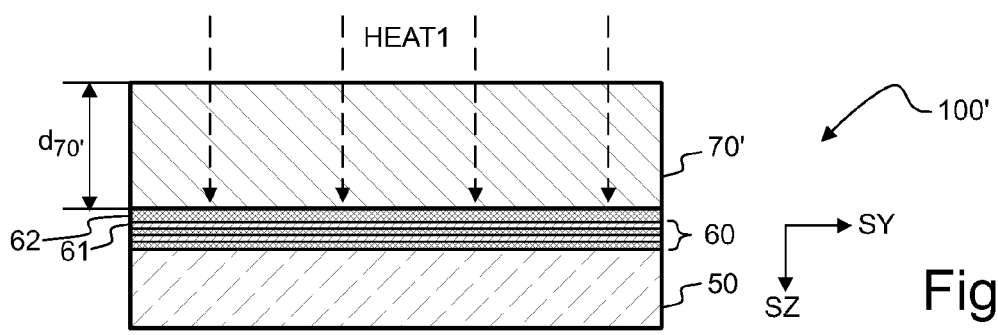
FIG. 6d shows, by way of example, in a cross-sectional side view, bonding the second substrate to the layer of silica.

Referring to FIG. 6d, the additional substrate 70' may be bonded to the first intermediate layer 62. The bonding may comprise heating (HEAT1) the semi-manufactured mirror plate 100'. The additional substrate 70' may have a preliminary thickness $d_{70'}$. In an embodiment, the bonding method may comprise heating the first intermediate layer 62 and the additional substrate 70' to a temperature, which is e.g. higher than 200° C. In an embodiment, the bonding method may comprise heating the first intermediate layer 62 and the additional substrate 70' to a temperature, which is e.g. higher than 300° C. In an embodiment, the bonding method may comprise heating the first intermediate layer 62 and the additional substrate 70' to a temperature, which is e.g. higher than 400° C.

Figure 6E:
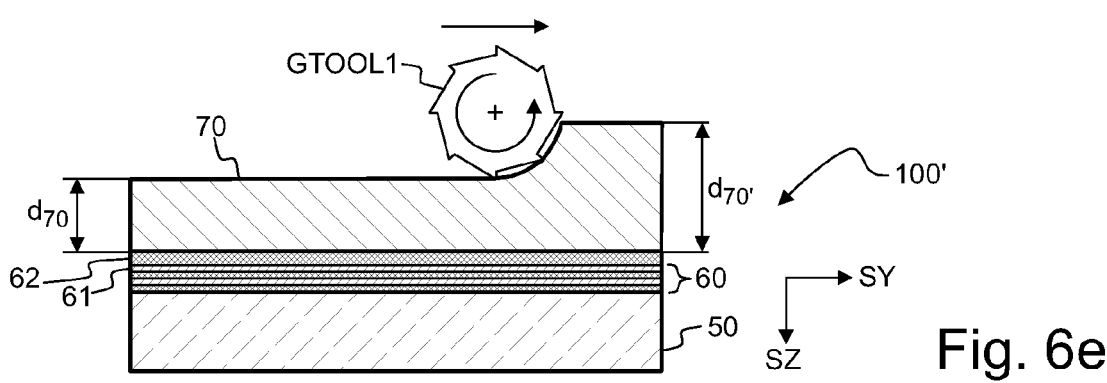
FIG. 6e shows, by way of example, in a cross-sectional side view, forming a second intermediate layer by reducing the thickness of the second substrate.

Referring to FIG. 6e, the thickness of the additional substrate 70' may be optionally reduced e.g. by mechanical grinding, milling or sawing. The thickness may be reduced e.g. by a mechanical tool GTOOL1, which may be e.g. a grinding wheel, or a saw blade. The upper surface of the second intermediate layer 70 may be optionally polished.

Figure 6F:
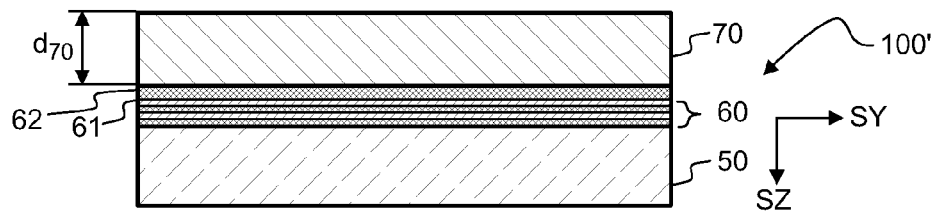
FIG. 6f shows, by way of example, in a cross-sectional side view, a semi-manufactured mirror plate comprising the first intermediate layer and the second intermediate layer.

Referring to FIG. 6f, the semi-manufactured mirror plate 100' formed by the bonding and the optional mechanical machining may comprise a second intermediate layer 70, which has a thickness $d_{70}$.

Figure 6G:
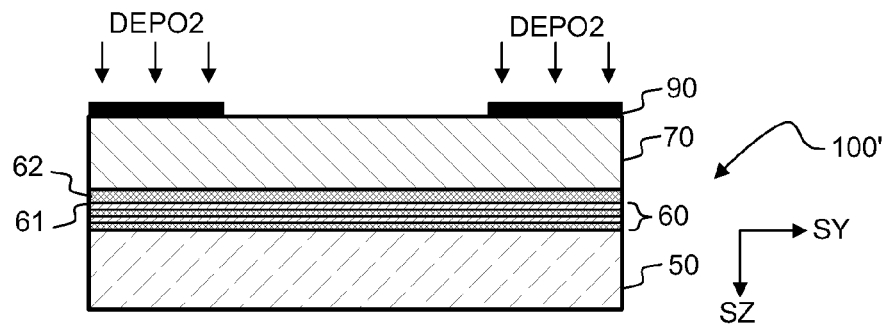
FIG. 6g shows, by way of example, in a cross-sectional side view, depositing a conductive layer on the second intermediate layer.

Referring to FIG. 6g, one or more electrodes 90 may be formed on top of the second intermediate layer 70. The electrodes may be formed e.g. by physical vapor deposition (PVD), in particular by sputtering. The material of the electrodes 90 may be e.g. gold, silver, copper or aluminum.

Figure 6H:
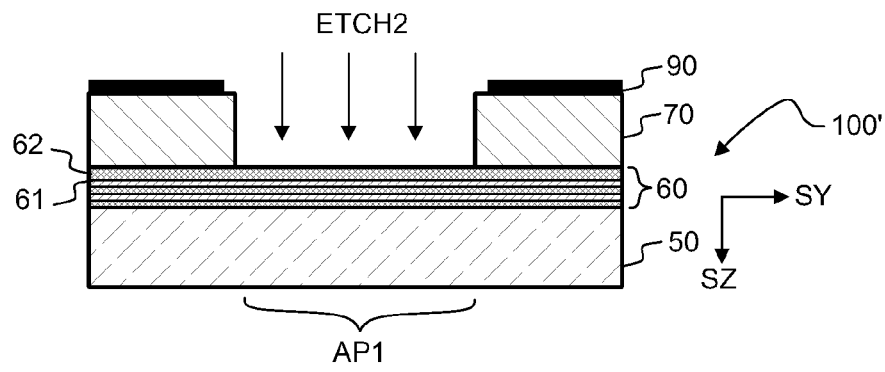
FIG. 6h shows, by way of example, in a cross-sectional side view, removing material of the second substrate from the aperture area of the mirror plate.

Referring to FIG. 6h, material of the second intermediate layer 70 may be locally removed from an aperture portion AP1 by an etching process ETCH2. The etching ETCH2 may comprise e.g. using reactive ion etching (RIE). The etching process ETCH2 may expose the first intermediate silica layer 62.

Figure 6I:
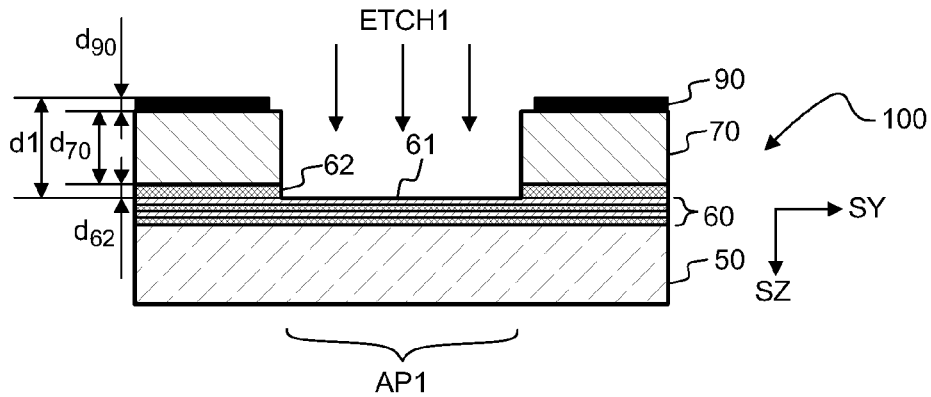
FIG. 6i shows, by way of example, in a cross-sectional side view, removing silica from the aperture area of the mirror plate.

Referring to FIG. 6i, the first intermediate layer 62 may be locally removed from the aperture portion AP1 by etching ETCH1. The etching ETCH1 may expose the uppermost layer 61 of the coating 60. The coating 60 may be exposed such that a solid-gas interface (or a solid-vacuum interface) is formed on the surface of the layer 61. For example, the etching ETCH1 may comprise using hydrogen fluoride vapor (HF) or by using a liquid, which comprises hydrogen fluoride (e.g. buffered oxide etch, BHF). The etching ETCH1 may gently remove $SiO_2$ from the aperture portion AP1, so as to expose the top surface of the layer 61 of the coating 60.

The etching ETCH1, which is used to remove the first intermediate layer 62 may be called e.g. as the first etching, and the etching ETCH2, which is used to remove the second intermediate layer 70 may be called e.g. as the second etching. The first etching ETCH1 may be carried out after the second etching ETCH2.

The first etching ETCH1 and the material of the uppermost layer 61 of the coating 60 may be selected such that the layer 61 is substantially resistant to the first etching ETCH1.

The second etching ETCH2 may be selected such that the first intermediate layer 62 is substantially resistant to the second etching ETCH2. The second etching ETCH2 may be selected such that the uppermost layer 61 of the coating 60 is not exposed during the second etching ETCH2. The second etching ETCH2 may be selected such that the first intermediate layer 62 is not penetrated during the second etching ETCH2.

The thickness $d_{62}$ of the first intermediate silica layer 62 may be e.g. in the range of 0.1 μm to 4 μm. The thickness $d_{62}$ of the first intermediate silica layer 62 may be e.g. in the range of 1 μm to 4 μm. The thickness $d_{70}$ of the second intermediate layer 70 may be e.g. in the range of 4 μm to 1000 μm. The thickness $d_{90}$ of the electrodes 90 may be e.g. in the range of 0.1 μm to 100 μm. The elevation d1 may be equal to the sum $d_{62}+d_{70}+d_{90}$.

The elevation d1 may depend on the total thickness ($d_{62}+d_{70}$) of the intermediate layers 62, 70. The total thickness ($d_{62}+d_{70}$) of the intermediate layers 62, 70 may be selected such that the elevation d1 of the upper surfaces of the electrodes 90, with respect to the solid-gas interface of the coating 60, may be e.g. in the range of 1 μm to 1000 μm, in the range of 3 μm to 1000 μm or in the range of 4 μm to 1000 μm.

Figure 6J:
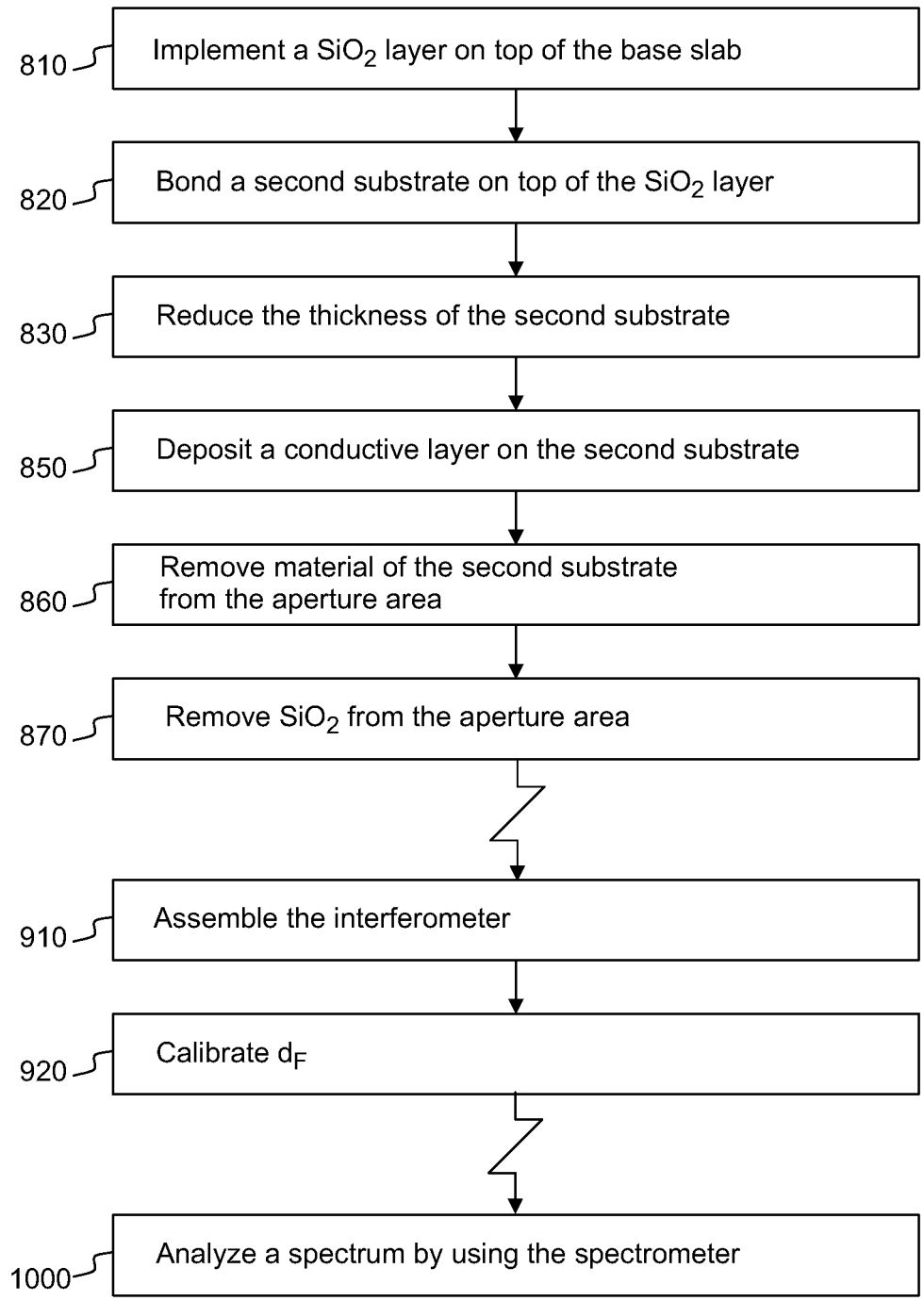
FIG. 6j shows, by way of example, method steps for implementing a sensor electrode on the mirror plate.

FIG. 6j shows method steps for producing a mirror plate 100, whose elevation d1 may be e.g. greater than 4 μm.

In step 810, the first intermediate layer 62 consisting of silica $SiO_2$ may be formed on the base slab 51. The first intermediate layer 62 consisting of silica $SiO_2$ may be formed on the multilayer coating 60.

In step 820, the additional substrate 70' may be bonded to the first intermediate layer 62 to form the second intermediate layer 70.

In step 830, the thickness of the additional substrate 70' may be optionally reduced e.g. by mechanical grinding.

In step 850, one or more electrodes 90 may be deposited on top of the second intermediate layer 70.

In step 860, material of the second intermediate layer 70 may be locally removed in order to expose the first intermediate layer 62.

In step 870, material of the first intermediate layer 62 may be locally removed from the aperture portion AP1 in order to expose the reflective multilayer coating 60.

In an optional step 910, a Fabry-Perot interferometer 300 comprising the mirror plate 100 and a second mirror plate 200 may be assembled at a later stage.

In an optional step 920, a capacitance value $C_d$ and/or a sensor signal value $S_d$ indicative of the capacitance value $C_d$ may be experimentally measured for at least one known mirror spacing value $d_F$. The mirror spacing value $d_F$ may be measured e.g. optically (see FIGS. 9a and 9b).

Measurement of the capacitance $C_d$ may require that the electrodes of the mirror plates 100, 200 are not in contact with each other, i.e. the capacitance $C_d$ may have a measurable value only when the electrodes forming the capacitance $C_d$ are not in galvanic contact with each other.

In an optional step 1000, a spectrometer 700 comprising the mirror plate 100 may be used for monitoring (unknown) spectrum OSPEC1 of an object OBJ1.

FIG. 7a shows, by way of example, a three-dimensional exploded view of a Fabry-Perot interferometer 300. The interferometer 300 may comprise a first mirror plate 100, a second mirror plate 200, and one or more actuators 301, 302, 303.

The exposed aperture portion AP1 of the first mirror plate 100 has an exposed top layer 61. Light LB1 impinging on the aperture portion AP1 may be transmitted through the aperture portion AP1 and/or the light LB1 may be reflected by the aperture portion AP1. Light LB1 impinging on the exposed coating 60 of the aperture portion AP1 may be partly transmitted through the exposed coating 60 and the substrate 50 of the aperture portion AP1, and the light LB1 impinging on the exposed coating 60 of the aperture portion AP1 may also be partly reflected by the exposed coating 60 of the aperture portion AP1.

The first mirror plate 100 may have one or more elevated electrodes 90a, 90b, 91a, 91b, 92a, 92b, 93a, 93b. The electrodes 90a, 90b, 91a, 91b, 92a, 92b, 93a, 93b may be galvanically separate from each other. The electrode 90a may have a terminal portion T1, and the electrode 90b may have a terminal portion T2. The capacitance monitoring unit 410 may be connected to the terminal portions T1, T2 e.g. by conductors 110a, 110b (FIG. 1), which have been bonded to the terminal portions T1, T2.

The second mirror plate 200 may comprise a reflective coating, which may have an exposed layer 261. The second mirror plate 200 may have one or more electrodes 290, 291, 292, 293. The electrodes 290, 291, 292, 293 may be called e.g. as counter electrodes. The dimensions and the position of the electrode 90a may be selected such that the electrode 90a at least partially overlaps the counter-electrode 290 when the interferometer 300 has been assembled.

The mirror plate 100 may optionally comprise a recessed portion 81 for providing space for the actuator 301.

FIG. 7b shows, in a three-dimensional view, the positions of the counter electrodes 290, 291, 292, 293 with respect to the electrodes 90a, 90b, 91a, 91b, 92a, 92b, 93a, 93b.

The electrodes 90a, 90b and 290 may be arranged to form a first sensor capacitor, which has a capacitance $C_d$, which is indicative of the mirror spacing $d_C$. The electrodes 90a and 290 may together form a first sub-capacitor. The electrodes 290 and 90b may together form a second sub-capacitor, which is connected in series with the first sub-capacitor. Consequently, sensor wires 110a, 110b (FIG. 1) need to be bonded to only one mirror plate 100 or 200. The sensor wires 110a, 110b do not need to be bonded to a moving part. The sensor wires 110a, 110b may be attached to the mirror plate 100 (or 200), which is immovable with respect to the capacitance monitoring unit 410.

The electrodes 91a, 91b and 291 may form a second sensor capacitor. The electrodes 92a, 92b and 292 may form a third sensor capacitor. The electrodes 93a, 93b and 293 may form a fourth sensor capacitor. Each sensor capacitor may have terminal portions T1, T2.

The Fabry-Perot interferometer is typically operated such that the reflective coating of the second plate 200 is substantially parallel to the reflective coating of the first plate 200. The mutual parallelism of the plates 100, 200 may be monitored by comparing the capacitance of the second sensor capacitor with the capacitance of the first sensor capacitance. For example, a non-zero difference between the capacitance of the first sensor capacitance and the capacitance of the second sensor capacitance may indicate that the second plate 200 is tilted about the axis SX. For example, a non-zero difference between the capacitance of the second sensor capacitance and the capacitance of the third sensor capacitor may indicate that the second plate 200 is tilted about the axis SY.

The control unit CNT1 may be arranged to drive the actuators 301, 302, 303 such that the reflective coating 60 of the plate 200 may be kept substantially parallel to the reflective coating of the plate 100. The control unit CNT1 may be arranged to drive the actuators 301, 302, 303 such that the reflective coating 60 of the plate 200 may be kept substantially parallel to the reflective coating of the plate 100 during varying the mirror spacing $d_F$.

In an embodiment, the first mirror plate 100 has only one electrode 90, and the second mirror plate has only one electrode 290 such that the electrodes 90, 290 may together form a sensor capacitor. A first sensor wire 110a may be bonded to the electrode 90, and a second sensor wire 110b may be bonded to the counter-electrode 290.

In an embodiment, the interferometer 300 may comprise three sensor capacitors for monitoring a tilt angle of the plate 200 about the axis SX, for monitoring a tilt angle of the plate 200 about the axis SY, and for monitoring the spatially averaged value of the mirror spacing $d_F$. A first tilt angle about the axis SX may be monitored e.g. by comparing the capacitance value of a first sensor capacitor with the capacitance value of a second sensor capacitor. A second tilt angle about the axis SY may be monitored e.g. by comparing the capacitance value of the second sensor capacitor with the capacitance value of a third sensor capacitor. The first sensor capacitor may be formed e.g. by the plates 90a, 290, 90b. The second sensor capacitor may be formed e.g. by the plates 91a, 291, 91b. The third sensor capacitor may be formed e.g. by the plates 92a, 292, 92b.

Figure 8A:
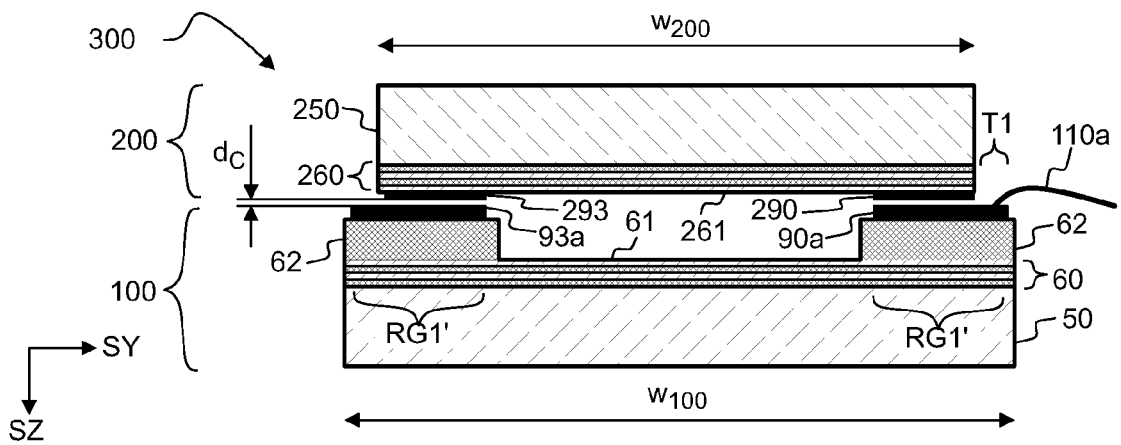
FIG. 8b shows, by way of example, in a cross-sectional side view, a Fabry-Perot interferometer, where both mirror plates have elevated sensor electrodes.
FIG. 8c shows, by way of example, in a cross-sectional side view, a Fabry-Perot interferometer, where the multilayer coating of the first mirror plate does not extend beneath the electrodes.

FIG. 8a shows an interferometer 300 comprising a first mirror plate 100 and a second mirror plate 200 positioned in the vicinity of the first plate 100. A terminal portion T1 of an electrode 90a may extend beyond the edge of the second plate 200 so that the electrode gap $d_C$ may be smaller than the thickness of the bonding wire 110a. In particular, the width $w_{200}$ of the second plate 200 may be smaller than the width $w_{100}$ of the first plate 100.

The first plate 100 may be formed e.g. according to a method, which was discussed with reference to FIGS. 4a to 4e, with reference to FIGS. 5a to 5f, and/or with reference to FIGS. 6a to 6j. The elevation d1 of the electrodes 90a, 93a of the plate 100 may be e.g. in the range of 2 µm to 1000 µm. The elevation of the electrodes 290, 293 of the second plate 200 may be e.g. smaller than 1 µm.

The second mirror plate 200 may comprise a reflective coating 260 implemented on a substrate 250. The second mirror plate 200 may comprise one or more electrodes implemented on the reflective coating 260 or on the substrate 250. The reflective coating 260 may be e.g. a dielectric multilayer coating.

Both bonding wires 110a, 110b may be connected to electrodes 90a, 90b on the first plate 100. Both bonding wires 110a, 110b may be connected to electrodes on the second plate 200. The first bonding wire 110a may be connected to an electrode 90, 90a on the first plate 100, and the second bonding wire 110b may be connected to an electrode 290 on the second plate 200.

The first plate 100 may be substantially immobile with respect to the capacitance monitoring unit 410, and the actuators 301, 302, 303 may be arranged to move the second plate 200 with respect to the first plate 100. The second plate 200 may be substantially immobile with respect to the capacitance monitoring unit 410, and the actuators 301, 302, 303 may be arranged to move the first plate 200 with respect to the second plate 200.

Figure 8B:
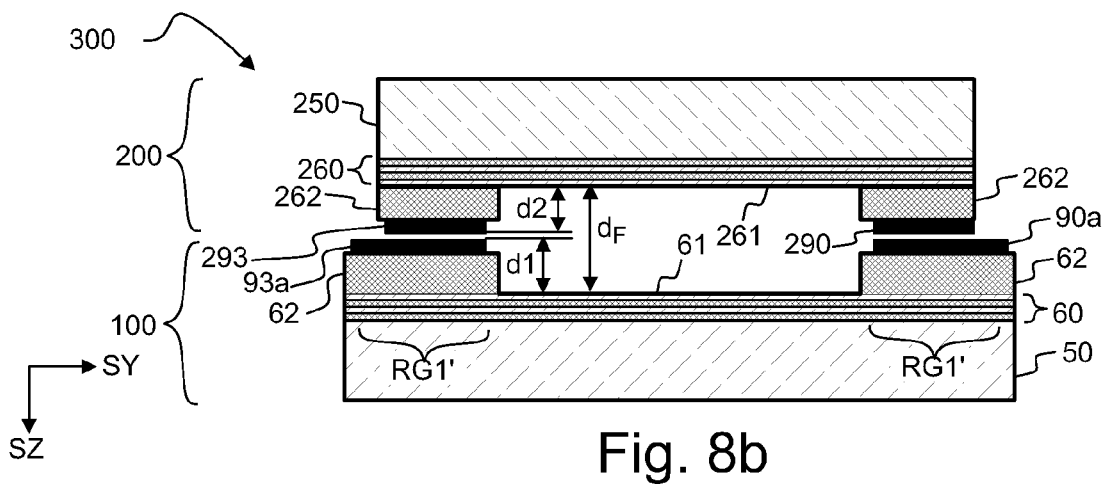

Referring to FIG. 8b, also the second mirror plate 200 may have elevated electrodes 290, 293. Also the second plate 200 may be formed e.g. according to the method shown in FIGS. 4a to 4e, in FIGS. 5a to 5f or in FIGS. 6a to 6j. The elevation d2 of the electrodes 290, 293 of the plate 200 may be e.g. in the range of 2 µm to 1000 µm.

The multilayer coating 60 may extend beneath the electrodes 90a, 90b, 91a, 91b, 92a, 92b, 93a, 93b as shown in FIGS. 8a and 8b. A portion RG1' of the intermediate layer 62 may provide support for an electrode, wherein said portion RG1' may be supported by the multilayer coating 60.

As shown e.g. in FIG. 4d, the multilayer coating 60 may extend beneath an electrode, i.e. a vertical line VLIN1 may intersect the multilayer coating 60 and the electrode, wherein said vertical line VLIN1 is perpendicular to the layer 61.

Figure 8C:
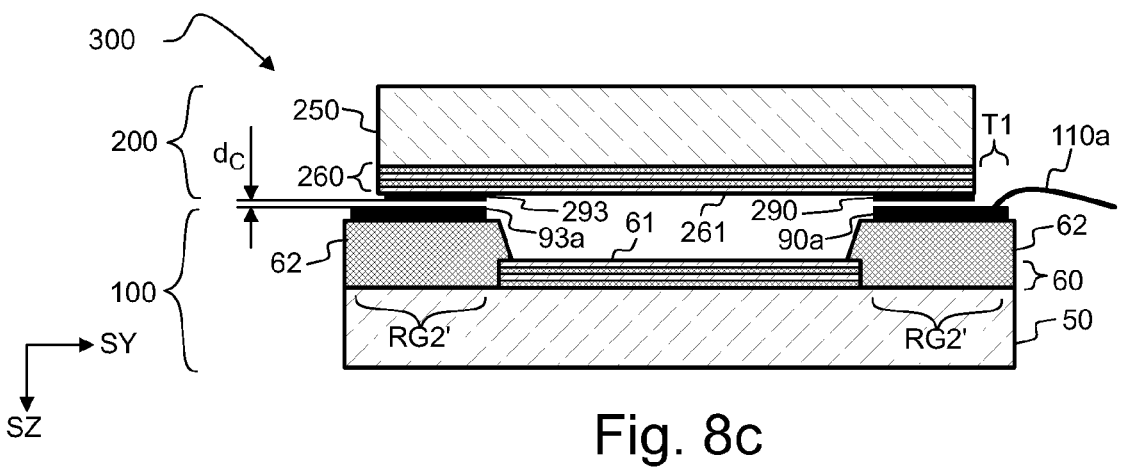

Referring to FIG. 8c, one or more of the electrodes 90a, 90b, 91a, 91b, 92a, 92b, 93a, 93b may also be implemented such that the multilayer coating 60 does not extend beneath the electrodes. In other words, a portion RG2' of the lowermost intermediate layer 62 may provide support for an electrode, wherein said portion RG2' may also be directly in contact with the substrate 50.

Figure 9A:
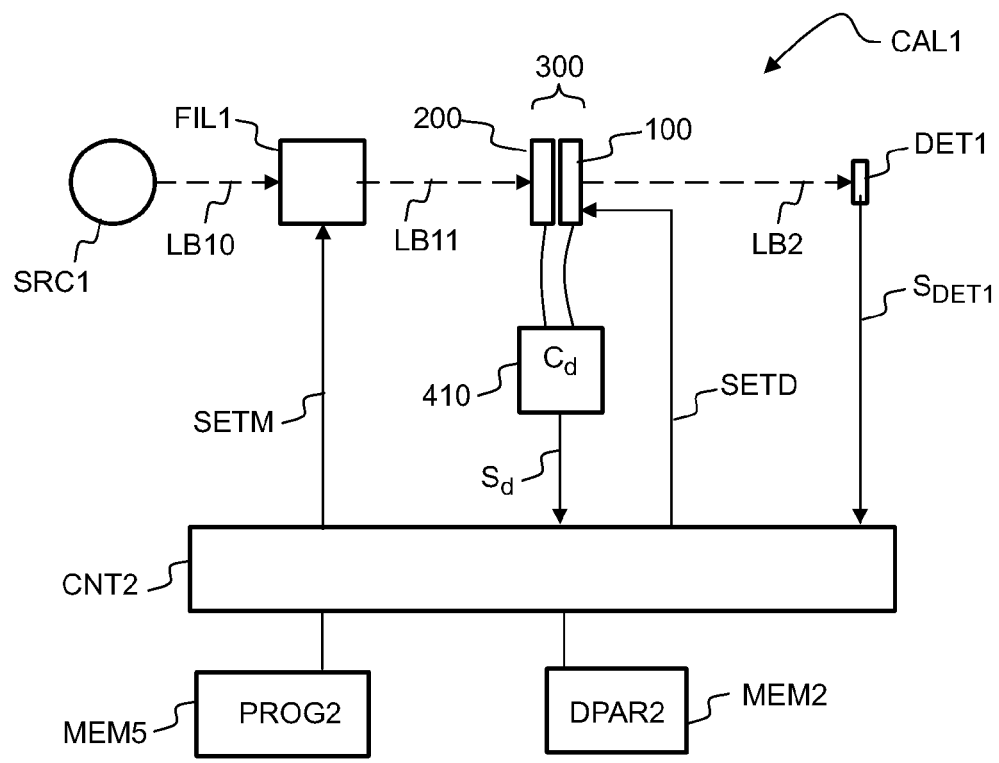
FIG. 9a shows, by way of example, a set-up for calibrating the mirror spacing.

FIG. 9a shows a system CAL1 for measuring a value of the sensor capacitance $C_d$ associated with a mirror spacing $d_F$. The system CAL1 may be arranged to provide sensor capacitance values $C_d$ associated with each relevant mirror spacing $d_F$. The system CAL1 may provide a sensor signal value $S_d$ associated with a mirror spacing $d_F$. The system CAL1 may provide sensor signal values $S_d$ associated with each relevant mirror spacing $d_F$.

The system CAL1 may be arranged to provide narrowband calibration light LB11. The calibration light LB11 may be substantially monochromatic. The calibration light LB11 has a wavelength $\lambda_M$. The wavelength $\lambda_M$ may be fixed or adjustable. The calibration light LB11 may be provided e.g. by filtering light LB10 of a broadband light source SRC1 with a monochromator FIL1. The interferometer 300 may provide transmitted light LB2 by filtering the calibration light LB11. An optical detector DET1 may be arranged to monitor the intensity of light LB2 transmitted through the Fabry-Perot interferometer 300. The detector DET1 may provide a detector signal $S_{DET1}$ indicative of the transmitted intensity.

The capacitance monitoring unit 410 may be arranged to provide a sensor signal $S_d$, which is indicative of the value of a sensor capacitance $C_d$. The system CAL1 may comprise a control unit CNT2, which may be arranged to change the wavelength $\lambda_M$ of the calibration light LB11 and/or the mirror spacing $d_F$, and to monitor the detector signal $S_{DET1}$ as a function of the parameters $\lambda_M$ and $S_d$.

The system CAL1 may comprise a memory MEM5 for storing computer program code PROG2, which when executed by one or more data processors may cause the system CAL1 to perform mirror spacing calibration.

The relationship between each value of the sensor signal $S_d$ and the corresponding mirror spacing $d_F$ may be stored in a memory MEM2 as one or more calibration parameters DPAR2. The calibration parameters DPAR2 may comprise e.g. a table, which contains a list of sensor signal values $S_d$ associated with respective mirror spacing values $d_F$. The calibration parameters DPAR2 may comprise e.g. a regression function, which may allow calculation of an estimate of the actual value of the mirror spacing $d_F$ as a function of the sensor signal $S_d$. An estimate of the actual value of the mirror spacing $d_F$ may be determined from the sensor signal $S_d$ by using said regression function. The calibration parameters DPAR2 may comprise e.g. a regression function, which may allow calculation of the spectral position $\lambda_0$ of the transmittance peak PEAK1 as a function of the sensor signal $S_d$.

Figure 9B:
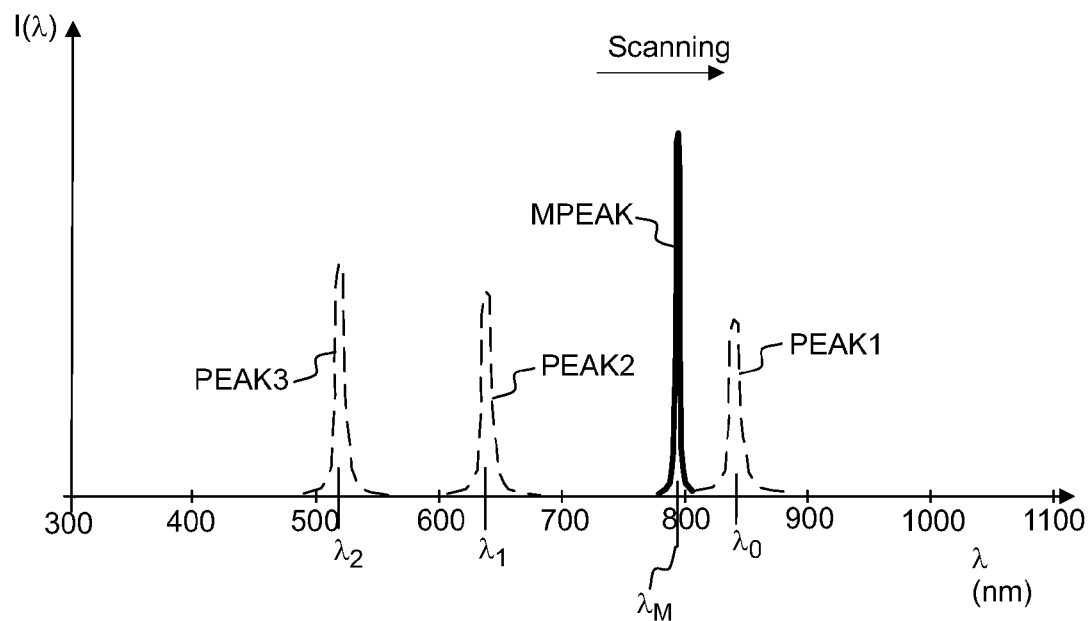
FIG. 9b shows, by way of example, spectral positions of the transmission peaks.

Referring to FIG. 9b, the Fabry-Perot interferometer may have one or more transmission peaks PEAK1, PEAK2, PEAK3. The spectral position $\lambda_0$ of the first peak PEAK1 may depend on the mirror spacing $d_F$. The spectral positions $\lambda_0$ of the peaks PEAK1, PEAK2, PEAK3 may depend on the mirror spacing $d_F$.

The control unit CNT2 of the system CAL1 may adjust the monochromator FIL1 such that the narrowband calibration light LB11 has a desired (known) wavelength $\lambda_M$. The marking MPEAK denotes the spectral peak of the calibration light LB11. The control unit CNT2 may change the spectral position $\lambda_0$ of the transmission peak PEAK1 by changing the mirror spacing $d_F$. The calibration may comprise varying the mirror spacing $d_F$ and/or varying the wavelength $\lambda_M$. For example, the mirror spacing $d_F$ may be varied while keeping the wavelength $\lambda_M$ constant. For example, the wavelength $\lambda_M$ may be varied while the mirror spacing $d_F$ is kept constant. For example the wavelength $\lambda_M$ and the mirror spacing $d_F$ may be varied.

The intensity transmitted through the interferometer 300 may reach a maximum when the spectral position $\lambda_0$ of the transmission peak PEAK1 substantially coincides with wavelength $\lambda_M$ of the narrowband calibration light LB11. The control unit CNT2 may be arranged to scan the mirror spacing $d_F$, and to determine a sensor signal value $S_d$ associated with the known wavelength $\lambda_M$ when $\lambda_0 = \lambda_M$, by monitoring when the transmitted intensity reaches a maximum.

The method may comprise varying the mirror spacing $d_F$ and recording a capacitance value $C_d$ and/or a sensor signal value $S_d$, which is associated with maximum transmitted intensity. When the transmitted intensity reaches a (local) maximum, a mirror spacing value $d_F$ can be determined from the wavelength $\lambda_M$ by using the Fabry-Perot transmission function and by using knowledge about the order of interference. The determined mirror spacing value $d_F$ may be associated with the recorded capacitance value $C_d$. The determined mirror spacing value $d_F$ may be associated with the recorded sensor signal value $S_d$. The wavelength $\lambda_M$ may be associated with the recorded capacitance value $C_d$. The wavelength $\lambda_M$ may be associated with the recorded sensor signal value $S_d$.

An associated pair of values ($C_d,d_F$) may be used for providing a regression function, which allows determining the mirror spacing as a function of the capacitance of the sensor capacitor. The associated pair of values ($S_d,d_F$) may be used for providing a regression function, which allows determining the mirror spacing as a function of the sensor signal. The associated pair of values ($C_d,\lambda_M$) may be used for providing a regression function, which allows determining the wavelength of transmission peak as a function of the capacitance of the sensor capacitor. The associated pair of values ($S_d,\lambda_M$) may be used for providing a regression function, which allows determining the wavelength of transmission peak as a function of the sensor signal. Several pairs of values ($C_d,d_F$) may be measured. The regression function may be determined based on several pairs of values ($C_d,d_F$).

The control unit CNT2 may be configured to scan the wavelength $\lambda_M$, when the mirror spacing $d_F$ is kept constant. The control unit CNT2 may be configured to determine a sensor signal value $S_d$ associated with the known wavelength $\lambda_M$ when $\lambda_0 = \lambda_M$, by monitoring when the transmitted intensity reaches a maximum.

The method may comprise:
assembling a Fabry-Perot interferometer 300, which comprises the a first mirror plate 100 and a second mirror plate 200, wherein the mirror plates comprise electrodes 90a, 90b, 290, which form a sensor capacitor whose capacitance $C_d$ depends on the mirror spacing $d_F$,
coupling narrowband light LB11 through the Fabry-Perot interferometer 300 to a detector DET1,
varying the wavelength $\lambda_M$ of the narrowband light LB11 and/or varying the mirror spacing $d_F$, and
monitoring the intensity of light transmitted through the Fabry-Perot interferometer 300.

The narrowband calibration light LB11 may also be e.g. a laser beam. The calibration light LB11 may be provided e.g. by a helium neon laser.

Figure 10:
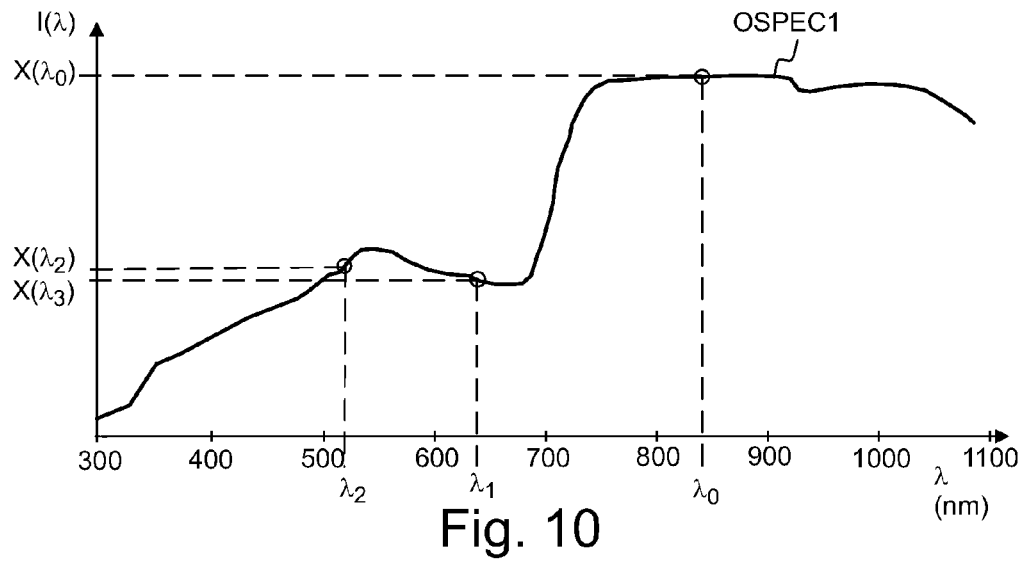
FIG. 10 shows, by way of example, the spectrum of an object.

FIG. 10 shows, by way of example, the spectral intensity $I(\lambda)$ of light LB1 received an object OBJ1. In particular, the curve OSPEC1 may represent the spectral intensity $I(\lambda)$ of light LB1 received from a certain point of the object OBJ1.

The spectral intensity $I(\lambda)$ may have a value $X(\lambda_0)$ at a wavelength $\lambda_0$, a value $X(\lambda_1)$ at a wavelength and a value $X(\lambda_2)$ at a wavelength $\lambda_2$. The values $X(\lambda_0)$, $X(\lambda_1)$, and/or $X(\lambda_2)$ may be determined from detector signals $S_R$, $S_G$, $S_B$ obtained from the optical sensor 600. The wavelengths $\lambda_0, \lambda_1, \lambda_2$ may be selected by adjusting the mirror spacing $d_F$ before the detector signals $S_R$, $S_G$, $S_B$ are obtained from the detector 600.

The mirror spacing $d_F$ may be scanned during a measurement in order to measure spectral range of the spectrum OSPEC1 of the object OBJ1. The mirror spacing $d_F$ may be scanned during a measurement in order to measure a wider spectrum of the object OBJ1.

In an embodiment, the mirror spacing $d_F$ may be kept substantially constant during a measurement in order to provide fast response. In other words, the mirror spacing d does not need to be scanned. For example, two or more intensity values $X(\lambda_0)$, $X(\lambda_1)$ may be measured substantially simultaneously by keeping the mirror spacing $d_F$ substantially constant during the measurement. By keeping the mirror spacing $d_F$ substantially constant, the intensity values $X(\lambda_0)$, $X(\lambda_1)$ may be measured substantially simultaneously e.g. when the light LB1 has rapidly fluctuating intensity. The mirror spacing $d_F$ may be kept substantially constant in order to determine a ratio $X(\lambda_0)/X(\lambda_1)$ of intensity values for light LB1 which has rapidly fluctuating intensity.

The object OBJ1 may be e.g. a real object or a virtual object. A real object OBJ1 may be e.g. in solid, liquid, or gaseous form. The real object OBJ1 may be a cuvette filled with a gas. The real object OBJ1 may be e.g. a plant (e.g. tree or a flower), a combustion flame, or an oil spill floating on water. The real object OBJ1 may be e.g. the sun or a star observed through a layer of absorbing gas. The real object may be e.g. an image printed on a paper. A virtual object OBJ1 may be e.g. an optical image formed by another optical device.

Figure 11:
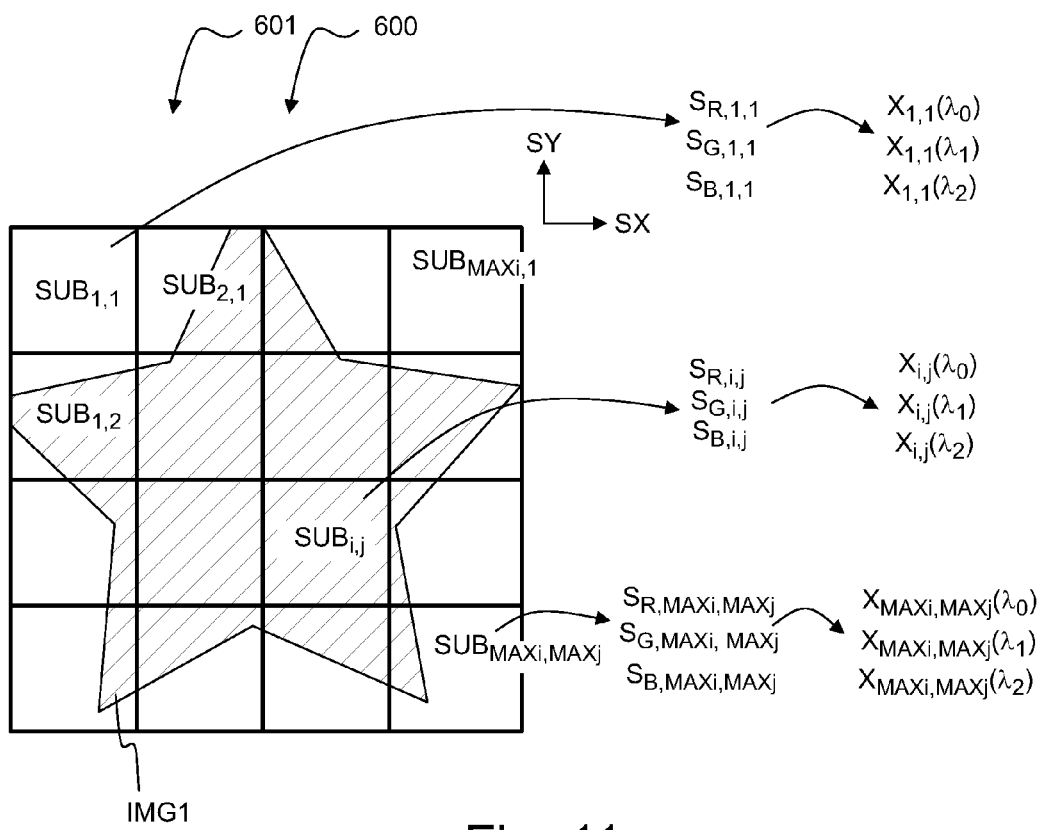
FIG. 11 shows, by way of example, determining intensity values for multiple points of an object.

FIG. 11 shows an optical image IMG1 formed on an image sensor 600. The image area of the sensor 600 may be partitioned into two or more sensor portions $SUB_{1,1}, \ldots SUB_{i,j}, \ldots, SUB_{MAXi,MAXj}$. The sensor portions may be arranged e.g. in two or more rows and in two or more columns. The number of the columns may be equal to MAXi, and the number of rows may be equal to MAXj. For example 81 sensor portions may be arranged in 9 columns and 9 rows. The sensor portions may be non-overlapping or partially overlapping.

Detector pixels P1, P2, P3 of a first sensor portion $SUB_{1,1}$ may provide detector signals $S_{R,1,1}$, $S_{G,1,1}$, $S_{B,1,1}$. Detector pixels P1, P2, P3 of a second sensor portion $SUB_{i,j}$ may provide detector signals $S_{R,i,j}$, $S_{G,i,j}$, $S_{B,i,j}$. Detector pixels P1, P2, P3 of a third sensor portion $SUB_{MAXi, MAXj}$ may provide detector signals $S_{R,MAXi, MAXj}$, $S_{G,MAXi, MAXj}$, $S_{B,MAXi, MAXj}$.

A group of intensity values $X(\lambda_0)$, $X(\lambda_1)$, $X(\lambda_2)$ may be measured for each spatially different portion $SUB_{1,1}, \ldots SUB_{i,j}, \ldots, SUB_{MAXi,MAXj}$. Thus, light LB1 originating from different parts of the object OBJ1 may be analyzed separately.

A first group of intensity values $X_{1,1}(\lambda_0)$, $X_{1,1}(\lambda_2)$ may be determined from the detector signals $S_{R,1,1}$, $S_{G,1,1}$, $S_{B,1,1}$. A second group of intensity values $X_{i,j}(\lambda_0)$, $X_{i,j}(\lambda_2)$ may be determined from the detector signals $S_{R,i,j}$ $S_{G,i,j}$, $S_{B,i,j}$. A third group of intensity values $X_{MAXi,MAXj}(\lambda_0)$, $X_{MAXi,MAXj}(\lambda_1)$, $X_{MAXi,MAXj}(\lambda_2)$ may be determined from the detector signals $S_{R,MAXi,MAXj}$, $S_{G,MAXi,MAXj}$, $S_{B,MAXi,MAXj}$.

The image sensor 600 may comprise one or more detector arrays 601, 602. The pixels P1, P2, P3 of each sensor portion $SUB_{i,j}$ may be located on the same detector array 601 or on different detector arrays 601, 602.

In an embodiment, the spectrometer 700 may be a imaging device, which comprises an image sensor 600. FIGS. 12a to 12d show various ways to implement an image sensor 600. The image sensor 600 may comprise one or more two-dimensional detector arrays 601, 602. A detector array 601, 602 may comprise a plurality of light-detecting pixels P1, P2. The optical image IMG1 formed on the detector array may simultaneously cover a plurality of detector pixels P1, P2 in order to analyze spatial variations of optical spectrum at different points of the two-dimensional image IMG1. The image IMG1 may cover e.g. four or more adjacent pixels P1,P2 in the direction SX, and four or more adjacent pixels in the direction SY.

Figure 12A:
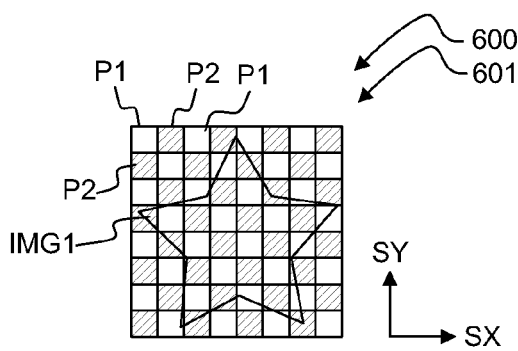
FIG. 12a shows, by way of example, in an end view, a detector array comprising first pixels and second pixels.

Referring to FIG. 12a, the detector array 601 may comprise a plurality of light-detecting pixels P1, P2. The image sensor 600 may comprise e.g. two types of pixels P1, P2 wherein the first pixels P1 may have a first spectral sensitivity $\eta_R(\lambda)$, and the second pixels P2 may have a second different spectral sensitivity $\eta_G(\lambda)$. The first pixels P1 and the second pixels P2 may be sensitive to different colors. The spectral sensitivities $\eta_R(\lambda)$, $\eta_G(\lambda)$ may be implemented e.g. by positioning an array of miniature optical filters over an array of light detectors. The pixels P1, P2 may be arranged e.g. according to a checkerboard pattern.

Figure 12B:
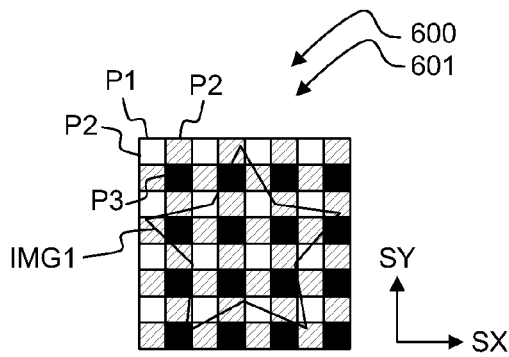
FIG. 12b shows, by way of example, in an end view, a detector array where pixels are arranged according to the Bayer matrix.

Referring to FIG. 12b, the image sensor 600 may comprise a plurality of light-detecting pixels P1, P2, P3 arranged e.g. in a Bayer matrix. The pixels P1 may be sensitive to red light, the pixels P2 may be sensitive to green light, and the pixels P3 may be sensitive to blue light. Image sensors of this type are commonly used e.g. in digital cameras.

Figure 12C:
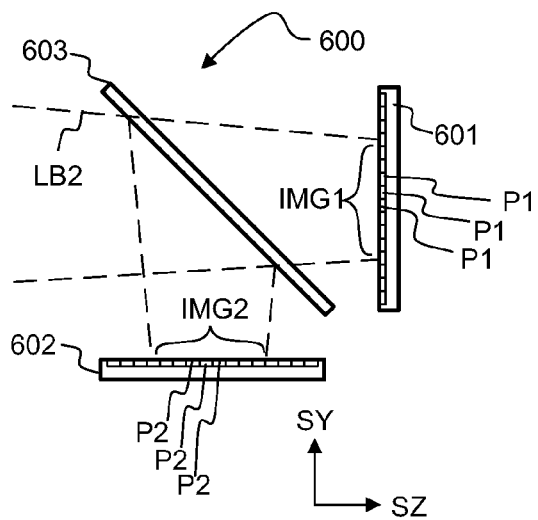
FIG. 12c shows, by way of example, in a side view, an image sensor comprising two detector arrays and a splitter.

Referring to FIG. 12c, the image sensor 600 may comprise a first detector array 601 and a second detector array 602. The first detector array 601 may comprise detector pixels P1, and the second detector array 602 may comprise detector pixels P2. The light LB2 may be distributed to the detector arrays 601, 602 by a beam splitter 603. The beam splitter 603 may be e.g. a dichroic mirror or a color separation prism. The image sensor 600 may be arranged to operate such that the first detector pixels P1 have the first spectral sensitivity $\eta_R(\lambda)$, and the second detector pixels P2 have the second different spectral sensitivity $\eta_G(\lambda)$. For example, the pixels P1 may have highest sensitivity to red light, and the pixels P2 may have highest sensitivity to green light. The image sensor 600 may optionally comprise a second beam splitter 203 and a third detector array to implement detector pixels P3. The pixels P3 may have highest sensitivity to e.g. blue light.

Figure 12D:
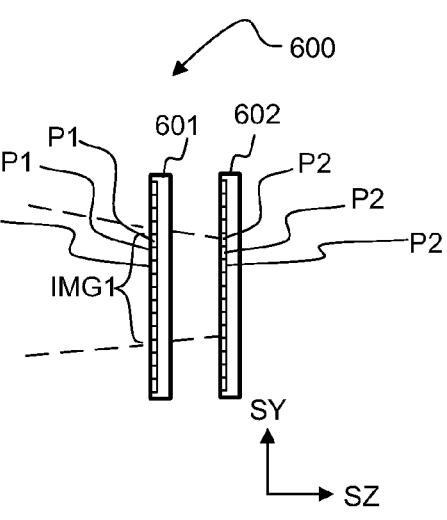
FIG. 12d shows, by way of example, in a side view, an image sensor comprising stacked detector arrays.

Referring to FIG. 12d, the image sensor 600 may comprise two or more detector arrays 601, 602 stacked on top of each other. A first detector array 601 may comprise pixels P1, and a second detector array 602 may comprise pixels P2. The first detector array 601 may be at least partially transparent at a spectral range, which matches with the spectral sensitivity of the pixels P2. The first detector array 601 may be arranged to transmit light to the pixels P2 of the second detector array 602. A pixel P1 of an image sensor 600 may provide a detector signal value $S_R$. A pixel P2 of the image sensor 600 may provide a detector signal value $S_G$. The image sensor 600 may comprise three or more detector arrays stacked on top of each other. A third detector array may comprise pixels P3. A pixel P3 of the image sensor 600 may provide a detector signal value $S_B$.

Figure 13:
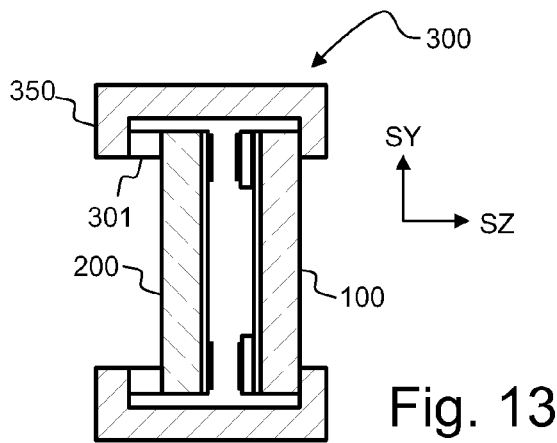
FIG. 13 shows, by way of example, in a cross-sectional side view, a Fabry-Perot interferometer where the actuators are attached to a frame.

Referring to FIG. 13, one of the mirror plates 100, 200 may be attached to a frame 350, and the other mirror plate 200, 100 may be moved by the actuator 301.

The base slab 51 may be obtained e.g. by cutting a substrate from a silicon wafer or by cutting from a sheet of silica. The multilayer coating 60 may be implemented e.g. after the cutting. The base slab 51 may be obtained e.g. by cutting a substrate from a silicon rod or from a silica rod. The base slab 51 may also have a more complex shape. For example, the shape of the slab 51 may resemble e.g. a truncated cone or a cube. The plate and the slab may optionally comprise one or more recessed portions and/or protruding portions (see e.g. the recessed portion 81 in FIG. 7a).

The term "slab" may refer to a body, which has one or more substantially planar portions. The slab may have a first substantially planar portion so as to minimize wavefront distortion of light transmitted and/or reflected by said planar portion. The slab may optionally have a second substantially planar portion, so as to minimize wavefront distortion of light transmitted through the first substantially planar portion and the second substantially planar portion. The first planar portion may cover the entire top surface of the slab, or the first planar portion may cover less than 100% of the top surface of the slab. The second planar portion may cover the entire bottom surface of the slab, or the second planar portion may cover less than 100% of the bottom surface of the slab. The slab may optionally have e.g. one or more protruding portions and/or recessed portions. In an embodiment, first planar portion may be substantially parallel to the second planar portion. In an embodiment, first planar portion and the second planar portion may define a non-zero wedge angle e.g. in order to reduce unwanted reflections.

The term "plate" may refer to a body, which has one or more substantially planar portions. The plate may have a first substantially planar portion so as to minimize wavefront distortion of light transmitted and/or reflected by said planar portion. The plate may optionally have a second substantially planar portion, so as to minimize wavefront distortion of light transmitted through the first substantially planar portion and the second substantially planar portion. The first planar portion may cover the entire top surface of the plate, or the first planar portion may cover less than 100% of the top surface of the plate. The second planar portion may cover the entire bottom surface of the plate, or the second planar portion may cover less than 100% of the bottom surface of the plate. The plate may optionally have e.g. one or more protruding portions and/or recessed portions. In an embodiment, first planar portion may be substantially parallel to the second planar portion. In an embodiment, first planar portion and the second planar portion may define a non-zero wedge angle e.g. in order to reduce unwanted reflections.

The term "light" may refer to electromagnetic radiation in the ultraviolet region (200 nm to 380 nm), visible region (380 nm to 760 nm), near infrared region (760 nm to 1.4 μm), middle infrared region (1.4 μm to 8 μm), and/or in the thermal infrared region (8 μm to 12 μm). The materials and the dimensions of the mirror plate 100 may be selected such that a Fabry Perot interferometer 300 comprising the mirror plate 100 may be applicable for spectral analysis e.g. in the ultraviolet region (200 nm to 380 nm), visible region (380 nm to 760 nm), near infrared region (760 nm to 1.4 µm), middle infrared region (1.4 µm to 8 µm), and/or in the thermal infrared region (8 µm to 12 µm).

For example, a spectrometer 700 comprising the mirror plate 100 may be arranged to measure the concentration of $CO_2$ by monitoring optical absorption in the infrared region. For example, a spectrometer 700 comprising the mirror plate 100 may be arranged to measure the concentration of an anesthesia gas by monitoring optical absorption in the infrared region. For example, a spectrometer 700 comprising the mirror plate 100 may be arranged to determine spectral data from human tissue or from animal tissue, e.g. in order to detect cancer or another abnormal condition.

Referring to FIGS. 1, and 4a to 8c, the lowermost intermediate layer 62 of the mirror plate 100 may consist essentially of silica $SiO_2$. The method for producing the mirror plate 100 for the Fabry-Perot interferometer may comprise:

- providing a base slab 51, which comprises a substrate 50 coated with a semi-transparent reflective multilayer coating 60,
- forming one or more intermediate layers 62 on the base slab 51 such that the lowermost intermediate layer 62 consists essentially of silica $SiO_2$, and such that the multilayer coating 60 is at least partially covered by the lowermost intermediate layer 62,
- forming one or more capacitive sensor electrodes 90a, 90b by depositing conductive material on top of the intermediate layers 62, and
- removing material of the lowermost intermediate layer 62 by etching ETCH1 in order to form an exposed aperture portion AP1 of the multilayer coating 60.

Several variations are illustrated by the following examples:

EXAMPLE 1

A method for producing a mirror plate (100) for a Fabry-Perot interferometer, the method comprising:

- providing a base slab (51), which comprises a substrate (50) coated with a semi-transparent reflective multilayer coating (60),
- forming one or more intermediate layers (62) on the base slab (51) such that the lowermost intermediate layer (62) substantially consists of silica (SiO2), and such that the multilayer coating (60) is at least partially covered by the lowermost intermediate layer (62),
- forming one or more capacitive sensor electrodes (90a, 90b) by depositing conductive material on top of the intermediate layers (62), and
- removing material of the lowermost intermediate layer (62) by etching (ETCH1) in order to form an exposed aperture portion (AP1) of the multilayer coating (60).

EXAMPLE 2

The method of example 1 wherein the material of the lowermost intermediate layer (62) is removed by first etching (ETCH1), and the material of the uppermost layer (61) of the multilayer coating (60) has been selected such that the uppermost layer (61) is substantially resistant to the first etching (ETCH 1).

EXAMPLE 3

The method of example 1 or 2 wherein the thickness ($d_{62}$) of the lowermost intermediate layer (62) is in the range of 1 µm to 4 µm.

EXAMPLE 4

The method according to any of the examples 1 to 3 wherein the electrodes (90a, 90b) are deposited on the top surface (62S) of the lowermost intermediate layer (62).

EXAMPLE 5

The method according to any of the examples 1 to 3 comprising forming a second intermediate layer (70) by bonding a second substrate (70') to the lowermost intermediate layer (62).

EXAMPLE 6

The method of example 5 comprising reducing the thickness ($d_{70'}$) of the second substrate (70') after the second substrate (70') has been bonded to the lowermost intermediate layer (62).

EXAMPLE 7

The method of example 5 or 6 comprising removing material of the second intermediate layer (70) by second etching (ETCH2), wherein the second etching (ETCH1) has been selected such that the lowermost intermediate layer (62) is substantially resistant to the second etching (ETCH2).

EXAMPLE 8

A mirror plate (100) for a Fabry-Perot interferometer, the mirror plate (100) comprising:

- a base slab (51), which has a substrate (50) coated with a semi-transparent reflective multilayer coating (60),
- one or more intermediate layers (62, 70) implemented on the base slab (51) such that the lowermost intermediate layer (62) substantially consists of silica ($SiO_2$),
- one or more capacitive sensor electrodes (90, 90a, 90b) implemented on top of the intermediate layers (62, 70), and
- an exposed aperture portion (AP1) of the multilayer coating (60) for reflecting and transmitting light (LB1), wherein the elevation (d1) of the capacitive electrodes (90, 90a, 90b) with respect to the exposed aperture portion (AP1) is in the range of 1 µm to 1000 µm.

EXAMPLE 9

The mirror plate (100) of example 8, which has been produced according to the method of any of the examples 1 to 7.

EXAMPLE 10

A Fabry-Perot interferometer (300) comprising:
- the mirror plate (100) of example 8 or 9,
- a second mirror plate (200), which comprises a counter electrode (290), wherein the interferometer (300) has an adjustable mirror spacing ($d_F$), and the electrodes (90a, 90b, 290) of the mirror plates (100, 200) form a capacitor, whose capacitance ($C_d$) depends on the mirror spacing ($d_F$).

EXAMPLE 11

The interferometer (300) of example 10 further comprising a capacitance monitoring unit (410) arranged to provide a sensor signal ($S_d$) indicative of said capacitance ($C_d$).

EXAMPLE 12

A spectrometer (700) comprising the interferometer (300) of example 11, and an image sensor (600) arranged to detect light (LB2) transmitted through the interferometer (300).

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A method for producing a mirror plate for a Fabry-Perot interferometer, the method comprising:
   providing a base slab, which comprises a substrate coated with a semi-transparent reflective multilayer coating,
   forming one or more intermediate layers on the base slab such that the lowermost intermediate layer substantially consists of silica, and such that the multilayer coating is at least partially covered by the lowermost intermediate layer,
   forming one or more capacitive sensor electrodes by depositing conductive material on top of the one or more intermediate layers, and
   forming an exposed aperture portion of the multilayer coating by removing material of at least the lowermost intermediate layer by etching.

2. The method of claim 1 wherein the material of the lowermost intermediate layer is removed by first etching, and the material of the uppermost layer of the multilayer coating has been selected such that the uppermost layer is substantially resistant to the first etching.

3. The method of claim 1 wherein the thickness of the lowermost intermediate layer is in the range of 1 µm to 4 µm.

4. The method of claim 1 wherein the electrodes are deposited on the top surface of the lowermost intermediate layer.

5. The method of claim 1 comprising forming a second intermediate layer by bonding a second substrate to an uppermost intermediate layer of the one or more intermediate layers.

6. The method of claim 5 comprising reducing the thickness of the second substrate after the second substrate has been bonded to the uppermost intermediate layer of the one or more intermediate layers.

7. The method of claim 5 comprising removing material of the second intermediate layer by second etching, wherein the second etching has been selected such that the uppermost intermediate layer is substantially resistant to the second etching.

8. A mirror plate for a Fabry-Perot interferometer, the mirror plate comprising:
   a base slab, which has a substrate coated with a semi-transparent reflective multilayer coating,
   one or more intermediate layers implemented on the base slab such that the lowermost intermediate layer substantially consists of silica,
   one or more capacitive sensor electrodes implemented on top of the one or more intermediate layers, and
   an exposed aperture portion of the multilayer coating for reflecting and transmitting light,
   wherein the elevation of the capacitive electrodes with respect to the exposed aperture portion is in the range of 1 µm to 1000 µm, and wherein the mirror plate has been produced by a method, which comprises:
   providing the base slab, which comprises the substrate coated with the semi-transparent reflective multilayer coating,
   forming the one or more intermediate layers on the base slab such that the lowermost intermediate layer substantially consists of silica, and such that the multilayer coating is at least partially covered by the lowermost intermediate layer,
   forming the one or more capacitive sensor electrodes by depositing conductive material on top of the intermediate layers, and
   forming the exposed aperture portion of the multilayer coating by removing material of at least the lowermost intermediate layer by etching.

* * * * *